US011733461B2

(12) United States Patent
Trita

(10) Patent No.: US 11,733,461 B2
(45) Date of Patent: Aug. 22, 2023

(54) ATHERMALIZED MULTI-PATH INTERFERENCE FILTER

(71) Applicant: ROCKLEY PHOTONICS LIMITED, Altrincham (GB)

(72) Inventor: Andrea Trita, Pasadena, CA (US)

(73) Assignee: Rockley Photonics Limited, Altrincham (GB)

( * ) Notice: Subject to any disclaimer, the term of this patent is extended or adjusted under 35 U.S.C. 154(b) by 0 days.

(21) Appl. No.: 17/216,538

(22) Filed: Mar. 29, 2021

(65) Prior Publication Data

US 2021/0215881 A1 Jul. 15, 2021

Related U.S. Application Data

(63) Continuation of application No. 17/150,950, filed on Jan. 15, 2021, now abandoned, which is a
(Continued)

(51) Int. Cl.
*G02B 6/293* (2006.01)
*G02B 6/12* (2006.01)

(52) U.S. Cl.
CPC ..... *G02B 6/29355* (2013.01); *G02B 6/12007* (2013.01); *G02B 6/12028* (2013.01);
(Continued)

(58) Field of Classification Search
CPC ............ G02B 6/29355; G02B 6/29301; G02B 6/29395; G02B 6/29311; G02B 6/12028;
(Continued)

(56) References Cited

U.S. PATENT DOCUMENTS 4,900,112 A * 2/1990 Kawachi ............ G02B 6/29353
385/141
5,515,460 A 5/1996 Stone
(Continued)

FOREIGN PATENT DOCUMENTS

CA 2 275 800 A1 12/2000
CA 2275800 A1 12/2000
(Continued)

OTHER PUBLICATIONS

Pathak, Shibnath, Silicon nano-Photonics based Arrayed Waveguide Gratings, IMEC, Mar. 2014 (Year: 2014).*
(Continued)

*Primary Examiner* — Peter Radkowski
(74) *Attorney, Agent, or Firm* — Lewis Roca Rothgerber Christie LLP

(57) ABSTRACT

A multi-path interference filter. The multi-path interference filter includes a first port waveguide, a second port waveguide, and an optical structure connecting the first port waveguide and the second port waveguide. The optical structure has a first optical path from the first port waveguide to the second port waveguide, and a second optical path, different from the first optical path, from the first port waveguide to the second port waveguide. The first optical path has a portion, having a first length, within hydrogenated amorphous silicon. The second optical path has a portion, having a second length, within crystalline silicon, and the second optical path has either no portion within hydrogenated amorphous silicon, or a portion, having a third length, within hydrogenated amorphous silicon, the third length being less than the first length.

19 Claims, 19 Drawing Sheets

Related U.S. Application Data continuation of application No. 17/073,132, filed on Oct. 16, 2020, now abandoned, which is a continuation of application No. 16/986,076, filed on Aug. 5, 2020, now abandoned, which is a continuation of application No. 16/883,862, filed on May 26, 2020, now abandoned, which is a continuation of application No. 16/816,142, filed on Mar. 11, 2020, now abandoned, which is a continuation of application No. 16/036,866, filed on Jul. 16, 2018, now abandoned.

(60) Provisional application No. 62/533,545, filed on Jul. 17, 2017.

(52) U.S. Cl.
CPC ...... *G02B 6/29301* (2013.01); *G02B 6/29311* (2013.01); *G02B 6/29395* (2013.01); *G02B 6/12011* (2013.01); *G02B 6/12014* (2013.01); *G02B 6/29398* (2013.01); *G02B 2006/12061* (2013.01)

(58) Field of Classification Search
CPC ............ G02B 6/12007; G02B 6/12011; G02B 6/29398; G02B 6/12014; G02B 2006/12061
See application file for complete search history.

(56) References Cited

U.S. PATENT DOCUMENTS

| | | | |
|---|---|---|---|
| 5,661,825 A | 8/1997 | Van Dam et al. | |
| 5,694,496 A | 12/1997 | Ando et al. | |
| 5,793,907 A | 8/1998 | Jalali et al. | |
| 5,901,259 A | 5/1999 | Ando et al. | |
| 6,049,640 A * | 4/2000 | Doerr | H04Q 11/0001 385/24 |
| 6,072,920 A | 6/2000 | Ando et al. | |
| 6,141,467 A | 10/2000 | Doerr | |
| 6,212,323 B1 * | 4/2001 | Harpin | G02B 6/125 385/39 |
| 6,304,706 B1 | 10/2001 | Sugita et al. | |
| 6,795,631 B2 * | 9/2004 | Noro | G02B 6/1203 385/132 |
| 6,856,751 B2 * | 2/2005 | Oaknin | G02B 6/266 356/477 |
| 6,888,984 B2 | 5/2005 | Abeles et al. | |
| 6,921,490 B1 | 7/2005 | Qian et al. | |
| 7,049,004 B2 | 5/2006 | Domash et al. | |
| 7,174,063 B2 | 2/2007 | Doerr et al. | |
| 7,382,953 B1 | 6/2008 | Bulthuis et al. | |
| 7,492,988 B1 | 2/2009 | Nordin et al. | |
| 8,873,910 B2 * | 10/2014 | Bulthuis | G02B 6/12028 385/27 |
| 9,207,399 B2 | 12/2015 | Roth et al. | |
| 9,329,337 B2 | 5/2016 | Kato et al. | |
| 9,366,819 B1 | 6/2016 | Bauters et al. | |
| 10,488,589 B2 | 11/2019 | Trita | |
| 10,955,613 B2 | 3/2021 | Trita | |
| 2002/0122651 A1 | 9/2002 | Roberts | |
| 2002/0181917 A1 * | 12/2002 | Noro | G02B 6/1203 385/132 |
| 2003/0072009 A1 | 4/2003 | Domash et al. | |
| 2003/0123799 A1 | 7/2003 | Lazaro Villa | |
| 2003/0161579 A1 | 8/2003 | Yan et al. | |
| 2004/0101239 A1 | 5/2004 | Parker | |
| 2007/0160326 A1 | 7/2007 | Kwakernaak et al. | |
| 2007/0183738 A1 * | 8/2007 | Welch | H01S 5/4025 385/147 |
| 2011/0142396 A1 | 6/2011 | Okamoto | |
| 2011/0164879 A1 | 7/2011 | Vasilyev et al. | |
| 2011/0229080 A1 * | 9/2011 | Bulthuis | G02B 6/12011 427/163.2 |
| 2013/0101252 A1 * | 4/2013 | Rasras | G02B 6/12026 385/24 |
| 2013/0243383 A1 | 9/2013 | Agarwal et al. | |
| 2013/0308904 A1 | 11/2013 | McGinnis et al. | |
| 2014/0376861 A1 | 12/2014 | Nakamura et al. | |
| 2015/0309252 A1 * | 10/2015 | Kato | G02B 6/2773 385/11 |
| 2017/0023736 A1 | 1/2017 | Bauters et al. | |
| 2017/0090122 A1 | 3/2017 | Kato | |
| 2019/0018196 A1 | 1/2019 | Trita | |
| 2019/0331853 A1 | 10/2019 | Trita | |

FOREIGN PATENT DOCUMENTS

| | | |
|---|---|---|
| CN | 1662836 A | 8/2005 |
| CN | 1845484 A | 10/2006 |
| CN | 102598548 A | 7/2012 |
| CN | 102902011 A | 1/2013 |
| CN | 203658692 U | 6/2014 |
| CN | 105093402 A | 11/2015 |
| CN | 105137538 A | 12/2015 |
| EP | 0297851 A2 | 1/1989 |
| EP | 0297851 A2 * | 4/1989 |
| EP | 0 826 989 A2 | 3/1998 |
| EP | 1 191 363 A1 | 3/2002 |
| EP | 1 319 967 A1 | 6/2003 |
| EP | 1367418 A1 | 12/2003 |
| EP | 1 698 922 A2 | 9/2006 |
| EP | 3 580 592 | 8/2018 |
| GB | 2 334 594 A | 8/1999 |
| JP | 7-104137 A | 4/1995 |
| JP | 2010-54620 A | 3/2010 |
| WO | WO 2014/060648 A1 | 4/2014 |
| WO | WO 2018/146221 A1 | 8/2018 |
| WO | WO 2019/016603 A1 | 1/2019 |

OTHER PUBLICATIONS

Kamei, Shin, Recent Progress on Athermal AWG Wavelength Multiplexer, OSA/LFC/NFOEC2009, OWO1.pdf (Year: 2009).*

Iodice et al., Thermo-optical static and dynamic analysis of a digital optical switch based on amorphous silicon waveguide, Optics Express, V. 14, N. 12, 2006 (Year: 2006).*

Cantore et al., 1.55-mm silicon-based reflection-type waveguide integrated thermo-optic switch, Opt. Eng. 42(10) 2835-2840 (Oct. 2003) (Year: 2003).*

Kaneko et al., "Athermal silica-based arrayed-waveguide grating (AWG) multiplexers with new low loss groove design," OFC/IOOC. Technical Digest. 1999, pp. 204-206 vol. 1 (Year: 1999).*

Bovington, J. et al., "Athermal laser design", Optics Express, Aug. 4, 2014, pp. 19357-19364, vol. 22, No. 16, Optical Society of America.

Chinese Notification of the Second Office Action, for Patent Application No. 201880025943.6, dated Mar. 9, 2022, 4 pages.

Partial English translation of the Chinese Notification of the Second Office Action, for Patent Application 201880025943.6, dated Mar. 9, 2022, 6 pages.

European Patent Office Extended Search Report, for Patent Application No. 22152318.6, dated May 24, 2022, 7 pages.

U.K. Intellectual Property Office Examination Report, for Patent Application No. GB2002124.2, dated Apr. 12, 2022, 4 pages.

Chinese Notification of of Decision on Rejection, for Patent Application No. 201880025943.6, dated Jun. 10, 2022, 5 pages.

Partial English translation of the Chinese Notification of Decision on Rejection, for Patent Application No. 201880025943.6, dated Jun. 10, 2022, 12 pages.

Chinese Notification of the First Office Action, for Patent Application No. 201880016541.X, dated May 6, 2020, 10 pages.

Chinese Notification of the Second Office Action, for Patent Application No. 201880016541.X, dated Dec. 9, 2020, 8 pages.

Cocorullo, G. et al., "Measurement of the thermo-optic coefficient of a-Si:H at the wavelength of 1500 nm from room temperature to 200° C.", Journal of Non-Crystalline Solids, 2002, pp. 310-313, Elsevier Science B.V.

(56) References Cited

OTHER PUBLICATIONS

European Patent Office Communication pursuant to Article 94(3) EPC, dated Apr. 19, 2021, for Patent Application No. 18 704 958.0, 5 pages.
Fukazawa, Tatsuhiko et al., "Very Compact Arrayed-Waveguide-Grating Demultiplexer Using Si Photonic Wire Waveguides", Japanese Journal of Applied Physics, Apr. 28, 2004, 4 pages, vol. 43, No. 5B, The Japan Society of Applied Physics.
International Search Report and Written Opinion of the International Searching Authority, dated Jul. 19, 2018, Corresponding to PCT/EP2018/053219, 19 pages.
International Search Report and Written Opinion of the International Searching Authority, dated Nov. 26, 2018, Corresponding to PCT/IB2018/000916, 12 pages.
Invitation to Pay Additional Fees and Communication Relating to the Results of the Partial International Search, dated May 8, 2018, corresponding to PCT/EP2018/053219, 8 pages.
Iodice, M. et al., "Thermo-optical static and dynamic analysis of a digital optical switch based on amorphous silicon waveguide", Optics Express, Jun. 12, 2006, pp. 5266-5278, vol. 14, No. 12, Optical Society of America.
Kamei, Shin, "Recent Progress on Athermal AWG Wavelength Multiplexer", 2009, 3 pages, Optical Society of America.
Lycett, Richard J. et al., "Perfect Chirped Echelle Grating Wavelength Multiplexor: Design and Optimization", IEEE Photonics Journal, Apr. 2013, 24 pages, vol. 5, No. 2, IEEE Photonics Society.
Madsen, Christi K., et al., "Chapter 4: Multi-Stage MA Architectures", Optical Filter Design and Analysis: A Signal Processing Approach, 1999, pp. 165-236, John Wiley & Sons, Inc.
Partial English translation of the Chinese Notification of the First Office Action, for Patent Application No. 201880016541.X, dated May 6, 2020, 19 pages.
Partial English translation of the Chinese Notification of the Second Office Action, for Patent Application No. 201880016541.X, dated Dec. 9, 2020, 17 pages.
Pathak, Shibnath, "Silicon Nano-Photonics based Arrayed Waveguide Gratings", IMEC, Mar. 2014, pp. 1-75, Universiteit Gent.
Pathak. S et al., "Comparison of AWGs and Echelle Gratings for Wavelength Division Multiplexing on Silicon-on-Insulator", IEEE Photonics Journal, Oct. 2014, 10 pages, vol. 6, No. 5.
Takei, Ryohei et al., "Sub-1 dB/cm submicrometer-scale amorphous silicon waveguide for backend on-chip optical interconnect", Optics Express, Feb. 24, 2014, pp. 4779-4788, vol. 22, No. 4, Optical Society of America.
Trita, Andrea et al., "Simultaneous Interrogation of Multiple Fiber Bragg Grating Sensors Using an Arrayed Waveguide Grating Filter Fabricated in SOI Platform", IEEE Photonics Journal, Dec. 2015, 12 pages, vol. 7, No. 6, IEEE Photonics Society.
U.K. Intellectual Property Office Combined Search and Examination Report, dated Aug. 8, 2018, for Patent Application No. GB 1802072.7, 8 pages.
U.K. Intellectual Property Office Examination Report, dated Sep. 18, 2019, for Patent Application No. GB 1802072.7, 4 pages.
U.K. Intellectual Property Office Examination Report, dated Feb. 7, 2020, for Patent Application No. GB1802072.7, 5 pages.
U.K. Intellectual Property Office Examination Report, dated Jun. 2, 2020, for Patent Application No. GB1802072.7, 6 pages.
U.S. Office Action from U.S. Appl. No. 15/643,399, dated Jan. 3, 2019, 14 pages.
U.S. Office Action from U.S. Appl. No. 15/643,399, dated May 9, 2019, 11 pages.
U.S. Office Action from U.S. Appl. No. 16/036,866, dated Apr. 4, 2019, 9 pages.
U.S. Office Action from U.S. Appl. No. 16/036,866, dated Dec. 12, 2019, 15 pages.
U.S. Office Action from U.S. Appl. No. 16/088,387, dated Apr. 30, 2020, 9 pages.
U.S. Office Action from U.S. Appl. No. 16/088,387, dated Feb. 12, 2020, 9 pages.
U.S. Office Action from U.S. Appl. No. 16/088,387, dated Jan. 22, 2021, 13 pages.
U.S. Office Action from U.S. Appl. No. 16/088,387, dated Nov. 12, 2019, 12 pages.
U.S. Office Action from U.S. Appl. No. 16/088,387, dated Oct. 8, 2020, 12 pages.
U.S. Office Action from U.S. Appl. No. 16/523,987, dated Aug. 20, 2020, 14 pages.
Zirngibl, M. et al., "Demonstration of a 15×15 Arrayed Wavegiude Multiplexer on InP", IEEE Photonics Technology Letters, Nov. 1992, pp. 1250-1253, vol. 4, No. 11, IEEE.
Chinese Notification of the First Office Action, for Patent Application No. 201880025943.6, dated Sep. 16, 2021, 9 pages.
Partial English translation of the Chinese Notification of the First Office Action, for Patent Application No. 201880025943.6, dated Sep. 16, 2021, 10 pages.
U.K. Intellectual Property Office Examination Report, dated Oct. 1, 2021, for Patent Application No. GB2002124.2, 2 pages.
Partial English Text of the Chinese Notification of the First Office Action, for Patent Application No. 201880025943.6, dated Sep. 16, 2021, 8 pages.
Search Report of the Chinese Notification of the First Office Action, for Patent Application No. 201880025943.6, dated Sep. 16, 2021, 3 pages.

* cited by examiner

ATHERMALIZED MULTI-PATH INTERFERENCE FILTER

CROSS-REFERENCE TO RELATED APPLICATION(S)

The present application is a continuation of U.S. patent application Ser. No. 17/150,950, filed Jan. 15, 2021, entitled "ATHERMALIZED MULTI-PATH INTERFERENCE FILTER", which is a continuation of U.S. patent application Ser. No. 17/073,132, filed Oct. 16, 2020, entitled "ATHERMALIZED MULTI-PATH INTERFERENCE FILTER", which is a continuation of U.S. patent application Ser. No. 16/986,076, filed Aug. 5, 2020, entitled "ATHERMALIZED MULTI-PATH INTERFERENCE FILTER", which is a continuation of U.S. patent application Ser. No. 16/883,862, filed May 26, 2020, entitled "ATHERMALIZED MULTI-PATH INTERFERENCE FILTER", which is a continuation of U.S. patent application Ser. No. 16/816,142, filed Mar. 11, 2020, entitled "ATHERMALIZED MULTI-PATH INTERFERENCE FILTER", which is a continuation of U.S. patent application Ser. No. 16/036,866, filed Jul. 16, 2018, entitled "ATHERMALIZED MULTI-PATH INTERFERENCE FILTER", which claims priority to and the benefit of U.S. Provisional Application No. 62/533,545, filed Jul. 17, 2017, entitled "A-SI:H FOR ATHERMAL WDM", the entire contents of all documents identified in this paragraph are hereby incorporated herein by reference as if fully set forth herein.

FIELD

One or more aspects of embodiments according to the present invention relate to arrayed waveguide gratings, and more particularly to an improved arrayed waveguide grating design.

BACKGROUND

Arrayed waveguide gratings (AWGs) may be used in various applications, to route light according to its wavelength. Rectangular AWGs may have various favorable characteristics, including compactness, but the number of channels and the channel spacing achievable with such devices may be limited by constraints on the transverse separation between waveguides of the array. Moreover, the behavior of an AWG, or of another multi-path interference filter, may be temperature-dependent.

Thus, there is a need for an improved multi-path interference filter design.

SUMMARY

According to an embodiment of the present disclosure there is provided an arrayed waveguide grating, including: a first star coupler; a second star coupler; an array of waveguides connecting the first star coupler and the second star coupler; one or more first port waveguides connected to the first star coupler; and one or more second port waveguides connected to the second star coupler, wherein: a first optical path, from a first waveguide of the first port waveguides, through a first waveguide of the array of waveguides, to a first waveguide of the second port waveguides, includes a portion, having a first length, within hydrogenated amorphous silicon, the remainder of the first optical path is within crystalline silicon, a second optical path, from the first waveguide of the first port waveguides, through a second waveguide of the array of waveguides, to the first waveguide of the second port waveguides, includes a portion, having a second length, within hydrogenated amorphous silicon, the remainder of the second optical path is within crystalline silicon, and the second length is different from the first length.

In one embodiment, a rate of change, with temperature, of a center wavelength of a channel of the arrayed waveguide grating is less than 70 pm/° C.

In one embodiment, the first waveguide of the array of waveguides includes a first portion, having a length equal to the first length, composed of hydrogenated amorphous silicon, the remainder of the first waveguide of the array of waveguides is composed of crystalline silicon, the second waveguide of the array of waveguides includes a portion, having a length equal to the second length, composed of hydrogenated amorphous silicon, and the remainder of the second waveguide of the array of waveguides is composed of crystalline silicon.

In one embodiment, an interface between the first portion of the first waveguide and a portion of the remainder of the first waveguide is a substantially planar surface having a surface normal, an angle between the surface normal and a longitudinal direction of the first portion being greater than 0.1 degrees.

In one embodiment, the angle between the surface normal and the longitudinal direction of the first portion is less than 30 degrees.

In one embodiment, the first star coupler includes a free propagation region including an area composed of hydrogenated amorphous silicon, the remainder of the free propagation region of the first star coupler being composed of crystalline silicon, the area including a wedge-shaped portion.

According to an embodiment of the present disclosure there is provided a multi-path interference filter, including: a first port waveguide; a second port waveguide; and an optical structure connecting the first port waveguide and the second port waveguide, the optical structure having: a first optical path from the first port waveguide to the second port waveguide, and a second optical path, different from the first optical path, from the first port waveguide to the second port waveguide, the first optical path having a portion, having a first length, within hydrogenated amorphous silicon, the second optical path having a portion, having a second length, within crystalline silicon, and the second optical path having either no portion within hydrogenated amorphous silicon, or a portion, having a third length, within hydrogenated amorphous silicon, the third length being less than the first length.

In one embodiment, an optical path delay difference between the first optical path and the second optical path has a rate of change, with temperature, of less than 2e-5 radians/° C.

In one embodiment, the optical structure comprises a Mach-Zehnder interferometer having: a first coupler, a second coupler, a first waveguide connecting the first coupler and the second coupler, and a second waveguide connecting the first coupler and the second coupler, wherein: a portion of the first optical path is within the first waveguide, and a portion of the second optical path is within the second waveguide.

In one embodiment, the optical structure comprises a generalized Mach-Zehnder interferometer having: a first coupler, a second coupler, a first waveguide connecting the first coupler and the second coupler, a second waveguide connecting the first coupler and the second coupler, and a third waveguide connecting the first coupler and the second coupler, wherein: a portion of the first optical path is within the first waveguide, and a portion of the second optical path is within the second waveguide.

In one embodiment, the optical structure includes two concatenated Mach-Zehnder interferometers.

In one embodiment, the optical structure includes an echelle grating.

In one embodiment, an optical path delay difference between the first optical path and the second optical path exhibits a maximum change, over a temperature range extending from 20° C. to 70° C., of less than 2e-3 radians.

BRIEF DESCRIPTION OF THE DRAWINGS

These and other features and advantages of the present invention will be appreciated and understood with reference to the specification, claims, and appended drawings wherein:

DETAILED DESCRIPTION

The detailed description set forth below in connection with the appended drawings is intended as a description of exemplary embodiments of a T-shaped arrayed waveguide grating provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the spirit and scope of the invention. As denoted elsewhere herein, like element numbers are intended to indicate like elements or features.

Figure 1A:
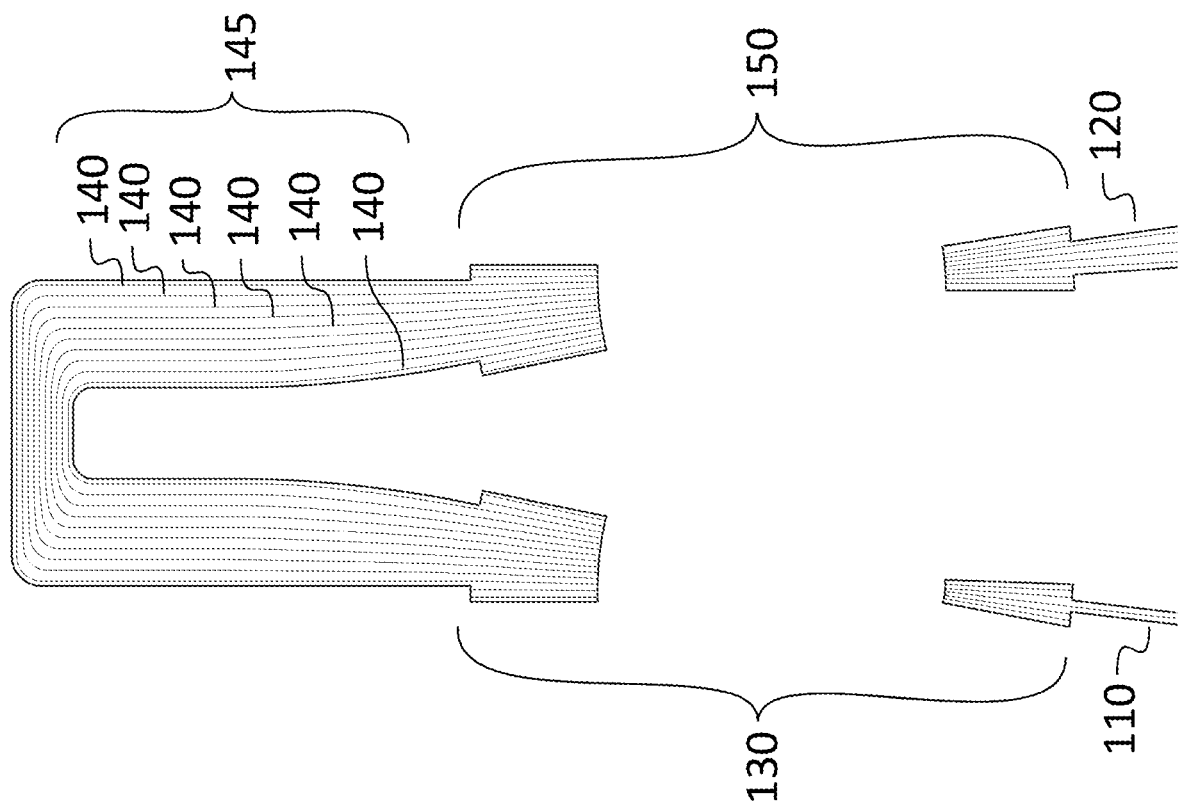
FIG. 1A is a plan view of a rectangular arrayed waveguide grating, according to an embodiment of the present invention.

Referring to FIG. 1A, in some embodiments a rectangular arrayed waveguide grating (AWG) may be used to direct light from an input waveguide 110 to one of a plurality of output waveguides 120 according to the wavelength of the light. Light from the input waveguide 110 illuminates, at a first star coupler 130, each waveguide 140 of an array 145 of waveguides 140, each of which has a different length. At a second star coupler 150, the light exiting the waveguides 140 may interfere constructively at one of the output waveguides 120.

The output waveguide at which the constructive interference occurs depends on the wavelength of the light; accordingly, a wavelength may be associated with each output waveguide 120. The wavelength (or frequency) difference between the wavelengths corresponding to two adjacent output waveguides is referred to herein as the "channel spacing". The AWG may be a reciprocal device, e.g., for light traveling in one direction through the AWG it may behave as a wavelength division multiplexing (WDM) multiplexer, and for light traveling in the opposite direction, it may behave as a WDM demultiplexer. Because light may travel in either direction through the AWG, the output waveguides 120 may be used as inputs, and the input waveguides 110 may be used as outputs. Accordingly, each of the input waveguides 110 and the output waveguides 120 may be referred to as a "port" waveguide.

Figure 1B:
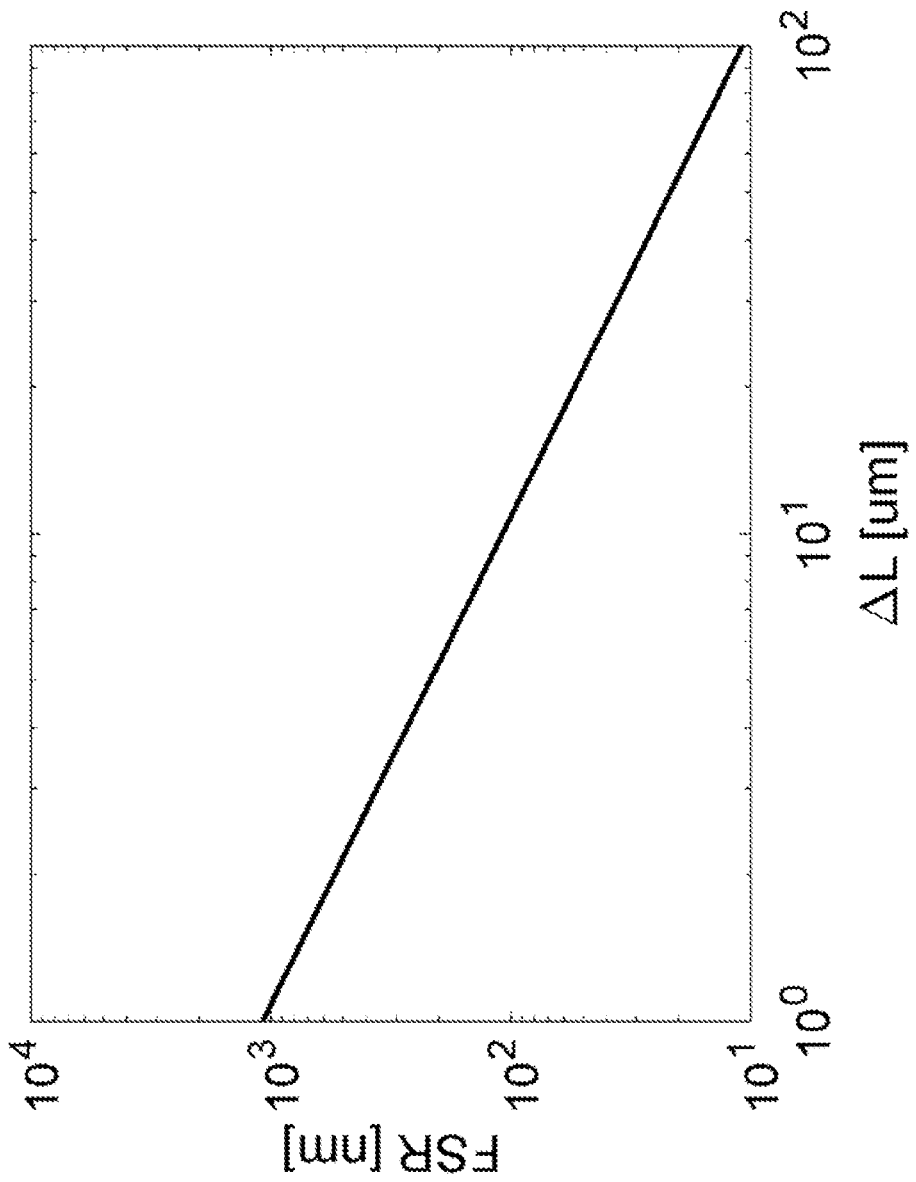
FIG. 1B is a graph of the free spectral range as a function of the incremental delay length, according to an embodiment of the present invention.
Figure 1C:
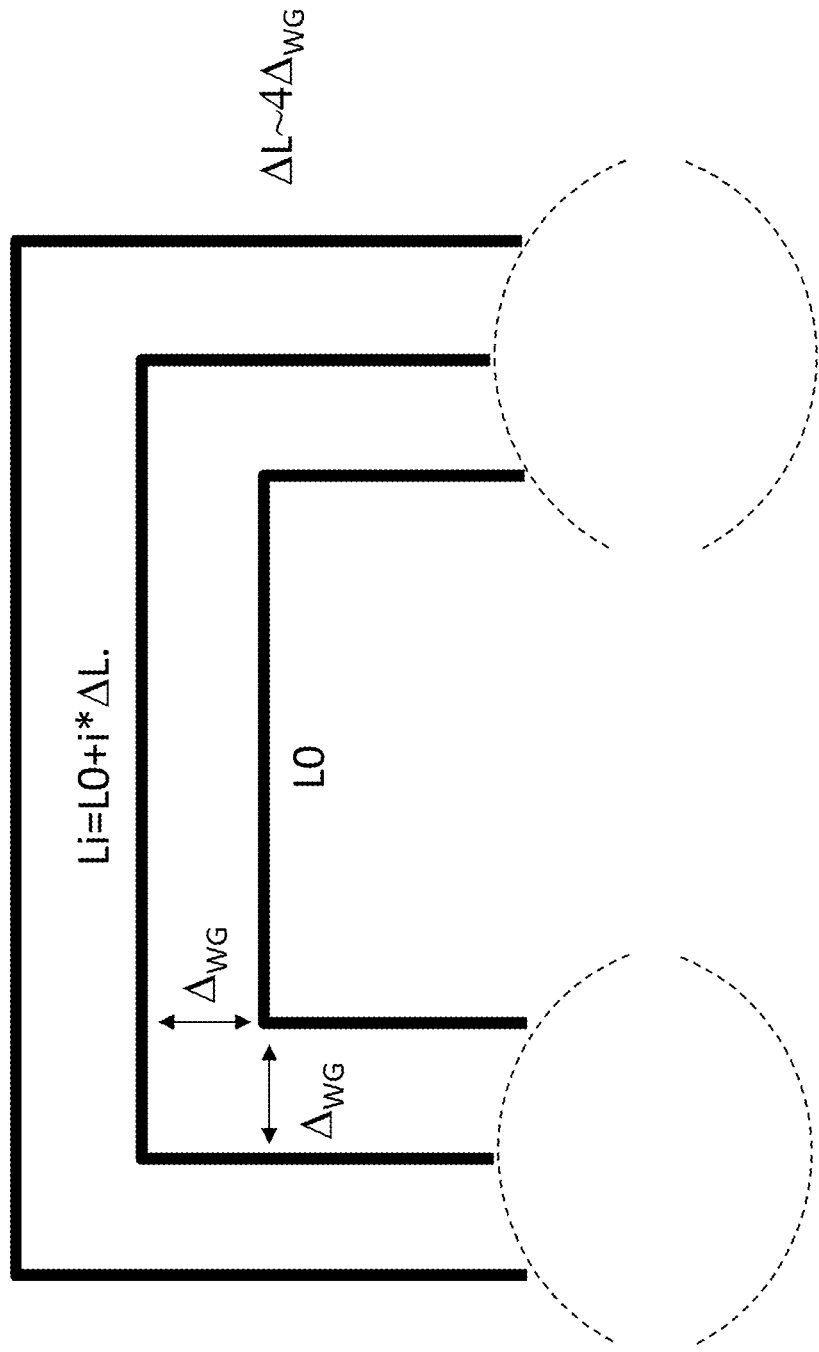
FIG. 1C is a schematic drawing of a rectangular arrayed waveguide grating, according to an embodiment of the present invention.

The free spectral range (FSR) of an AWG may be related to the incremental delay length ($\Delta L$) of the waveguide array by the expression $FSR=c/(n_g \Delta L)$, where $n_g$ is the group index of the waveguide used in the waveguide array and depends on the fabrication platform, and c is the speed of light in vacuum. This expression is plotted in FIG. 1B in the case of a 3 um silicon on insulator (SOI) platform. The FSR of an AWG, on the other hand, may be larger or equal to the product $N_{Ch} \times Ch_{spac}$, in order, for example, to have each channel within the range of interest univocally routed out of the corresponding output port of the AWG. A trade-off thus emerges between the product $N_{Ch} \times Ch_{spac}$ and the incremental delay length (ΔL): a small incremental delay length (ΔL) may be used for an AWG with a large number of channels or a large channel spacing (or both). In the case of a rectangular AWG layout, the minimum incremental delay length (ΔL) may be constrained by the minimum transverse separation AWG between the waveguides, which in turn may be constrained to prevent excessive mode overlap or physical overlapping of the waveguides (FIG. 1C). For this reason it may not be feasible to achieve more than 16 channels at a channel separation of 100 GHz, with a rectangular AWG layout fabricated on a 3 um SOI platform.

Figure 2B:
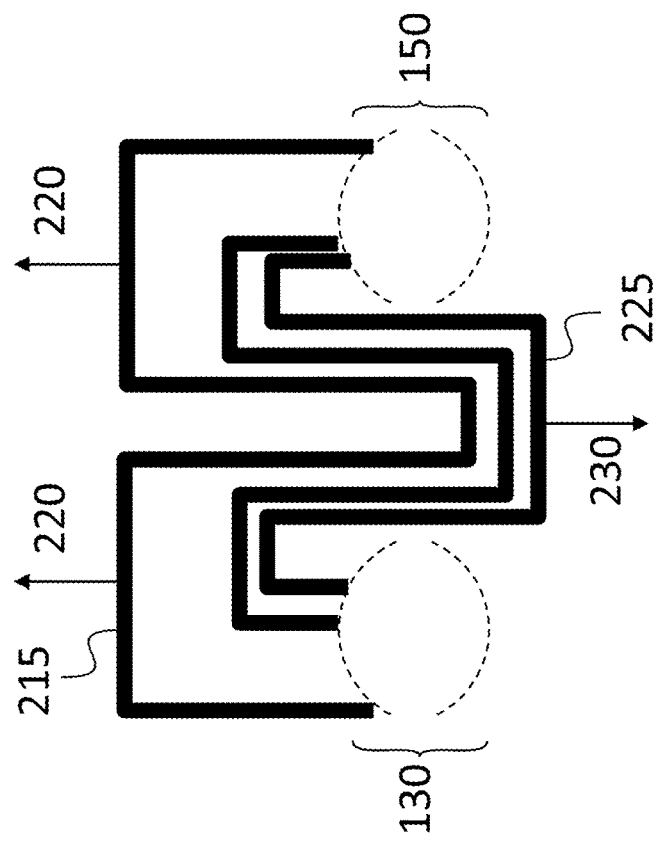
FIG. 2B is a schematic drawing of a T-shaped arrayed waveguide grating, according to an embodiment of the present invention.
Figure 2A:
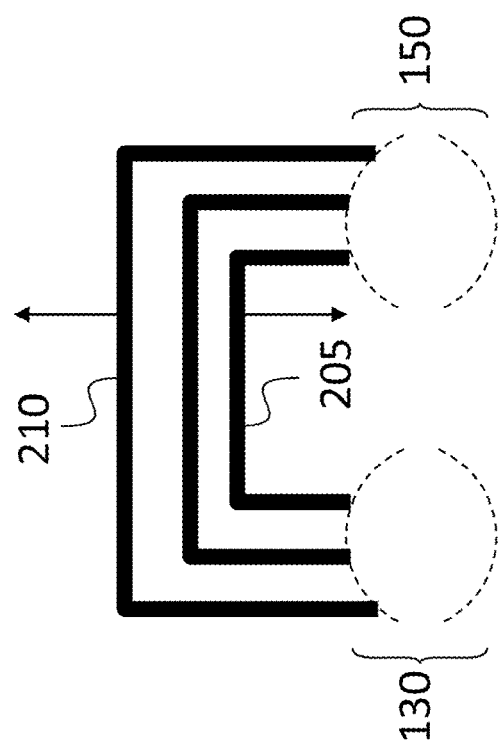
FIG. 2A is a schematic drawing of a rectangular arrayed waveguide grating, according to an embodiment of the present invention.

Referring to FIG. 2A, in a rectangular AWG design, the length difference between an innermost waveguide 205 of the array of waveguides and an outermost waveguide 210 of the array of waveguides may be adjusted by moving the respective horizontal portions up or down as shown by the arrows, but the minimum length difference that may be achieved is constrained if the waveguides 205, 210 are to avoid interfering with each other or with other waveguides that may exist between them.

By contrast, in the T-shaped array of waveguides of the AWG of FIG. 2B, the outermost waveguide 215 may be lengthened, without interfering with other waveguides of the array, by moving one or both of the upper horizontal portions upward (as shown by two upper arrows 220), and the innermost waveguide 225 may be lengthened, without interfering with other waveguides of the array, by moving the lower horizontal portion downward (as shown by the lower arrow 230). As such, the innermost waveguide 225 may be longer or shorter than the outermost waveguide 215, and the smallest length difference achievable is not affected by constraints on the minimum transverse separation between adjacent waveguides. Star couplers 130, 150 are shown schematically in FIGS. 2A and 2B. Moreover, the layout of the AWG of FIG. 2B facilitates the inclusion of a relatively large number waveguides in the array. The ability to include a relatively large number of waveguides may be advantageous in AWG designs in which the number of waveguides in the array is 3-6 times the greater of (i) the number of input channels and (ii) the number of output channels.

Figure 3:
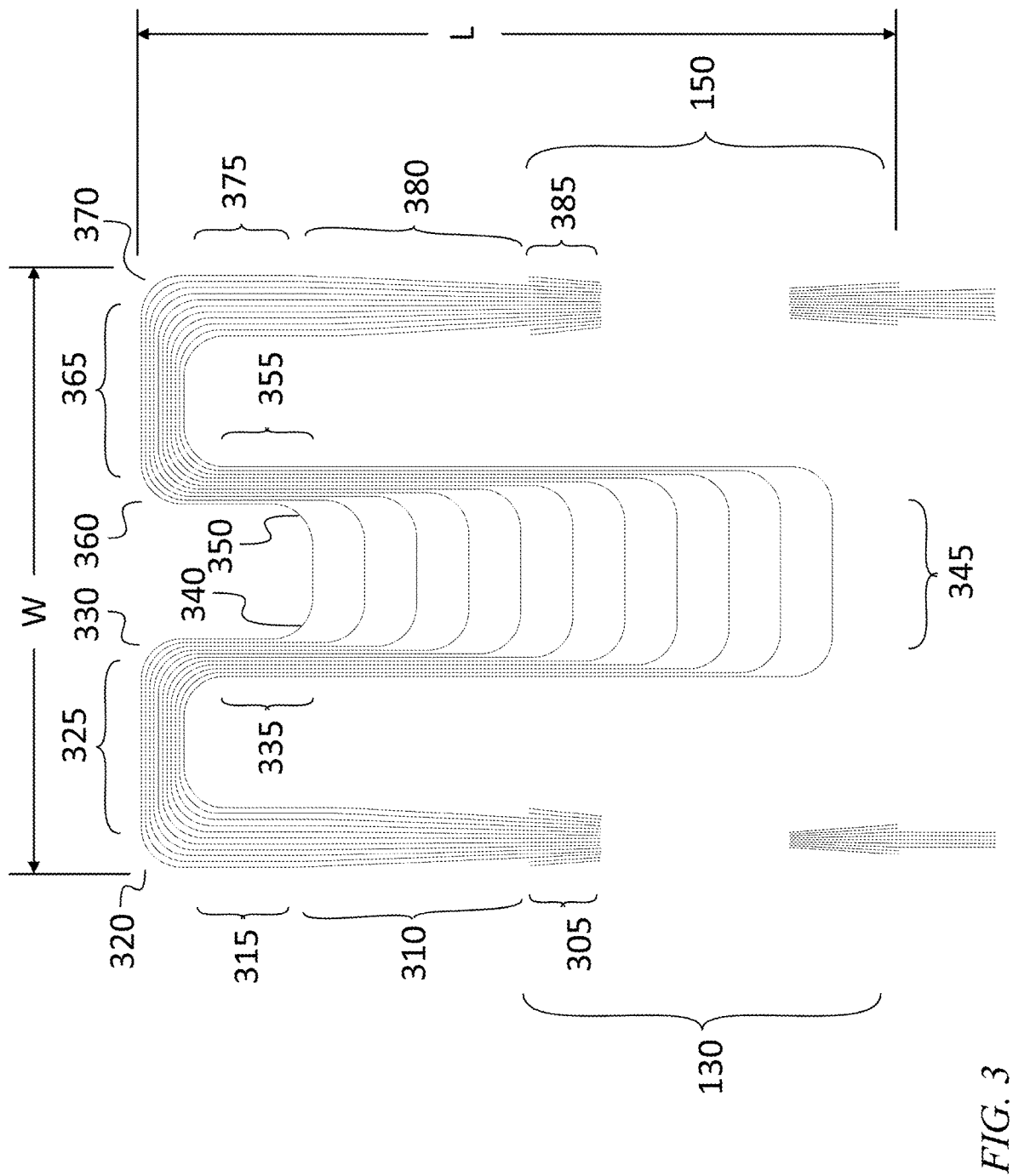
FIG. 3 is a plan view of a T-shaped arrayed waveguide grating, according to an embodiment of the present invention.

Referring to FIG. 3, in some embodiments each waveguide of the array may include, along the waveguide in a direction from the first star coupler to the second coupler, a first straight section 305 (inside an aperture of the first star coupler 130), a first curved section 310, a second straight section 315, a first clockwise bend 320, a third straight section 325, a second clockwise bend 330, a fourth straight section 335, a first counterclockwise bend 340, a fifth straight section 345, a second counterclockwise bend 350, a sixth straight section 355, a third clockwise bend 360, seventh straight section 365, a fourth clockwise bend 370, an eighth straight section 375, a second curved section 380, and a ninth straight section 385 (inside an aperture of the first star coupler 130).

As such, each waveguide of the array may include four clockwise bends and two counterclockwise bends, along the waveguide in a direction from the first star coupler to the second coupler, or, equivalently, each waveguide of the array may include four counterclockwise bends and two clockwise bends, along the waveguide in a direction from the second star coupler to the first coupler. In some embodiments some of the straight sections may be absent. For example, the third straight section 325 and the seventh straight section 365 may be absent for the innermost waveguide, and/or the fifth straight section 345 may be absent for the outermost waveguide.

A "bend" or a "curved section" as used herein, is a section of waveguide within which the curvature is in one direction, e.g., clockwise when progressing along the wavelength in one direction and counterclockwise when progressing along the wavelength in the opposite direction. Although in general a bend may be referred to as a curved section, and vice versa, the convention herein is to use the term "bend" to refer to sections of waveguide having a relatively short radius of curvature (e.g., less than 200 microns) and resulting in a significant change in direction (e.g., more than 60 degrees, and to use the term "curved section" to refer to sections of waveguide having a relatively long radius of curvature (e.g., between 0.5 mm and 20 mm) and resulting in a relatively small change in direction (e.g., less than 10 degrees).

Bends may be counted according to the total amount of direction change. For example, a sharply curved portion of the waveguide in which the direction changes by 180 degrees may be referred to as a single 180 degree bend, or, equivalently, as two 90 degree bends. Two sharply curved portions, separated by a straight section, may be referred to as two 90 degree bends if the direction change in each of them is 90 degrees, or they may be referred to as a single 180 degree bend. Each straight section may have a curvature of less than 0.01/mm. In some embodiments each bend of each waveguide is substantially identical to the corresponding bends of all of the other waveguides of the array, so that phase effects of the bends are common mode and the phase differences between the waveguides are due only to length differences. In some embodiments all of the clockwise bends have a first shape, and all of the counterclockwise bends have a second shape. In some embodiments each counterclockwise bend has a shape that is a mirror image of the shape of each of the clockwise bends.

The entire structure may be compact, having an overall length L, and an overall width W, as shown, and occupying an effective chip area of L×W. W may be between 1.5 mm and 14 mm, or, in some embodiments, between 3 mm and 7 mm, and L may be between 4 mm and 28 mm or, in some embodiments, between 8 mm and 14 mm. The effective chip area may be between 6 mm² and 35 mm². For example, in one embodiment, an arrayed waveguide grating with 24 channels and a channel spacing of 100 GHz has dimensions of 3 mm×8 mm. In another embodiment, an arrayed waveguide grating with 48 channels and a channel spacing of 100 GHz has dimensions of 7 mm×14 mm.

Figure 4A:
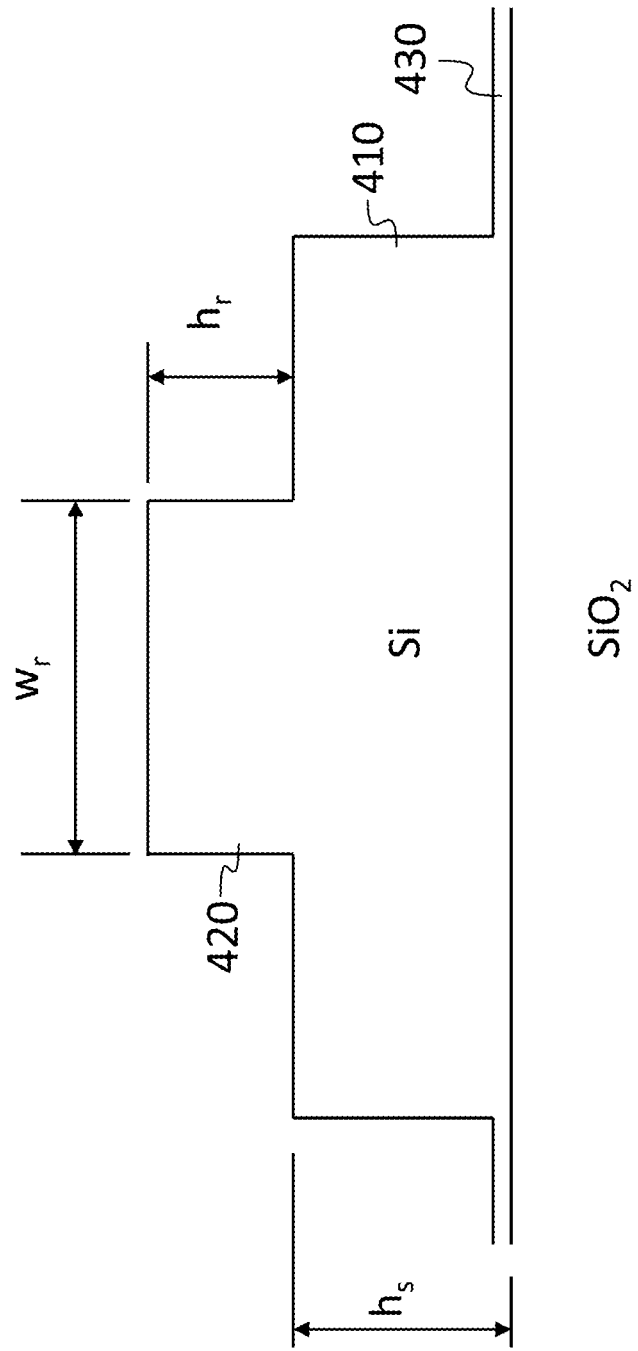
FIG. 4A is a cross section of a rib waveguide, according to an embodiment of the present invention.

In some embodiments, each of the waveguides of the waveguide array is a rib waveguide along one or more portions of its length. Referring to FIG. 4A, the waveguide may be fabricated as a silicon on insulator (SOI) structure, in which a layer of silicon (Si) 3 microns thick, on a layer of silicon dioxide ($SiO_2$) (which may be referred to as "buried oxide" or "BOX" layer) is etched to form a slab portion 410 and a rib portion 420 extending above the slab portion 410. In one embodiment, the width $w_r$ of the rib is 3.0 microns, the height $h_r$ of the rib is 1.2 microns, and the height $h_s$ of the slab is 1.8 microns. A thin (e.g., 0.2 micron thick) layer 430 of silicon may remain on the silicon dioxide in regions on both sides of the slab, for fabrication purposes; this layer may have a negligible effect on the optical characteristics of the waveguide. Adjacent waveguides in the waveguide array 120 may share a slab portion 410 (as shown in FIG. 4C).

Each waveguide may have a rib cross section in the curved sections 310, 380. The curved rib waveguide may shed higher order modes (i.e., confine them sufficiently poorly that their attenuation within these portions is great, e.g., more than 1000 dB/cm), and as a result any light coupled into the bends 320, 370 adjacent to the curved sections 310, 380 may be substantially entirely in the fundamental modes.

Figure 4B:
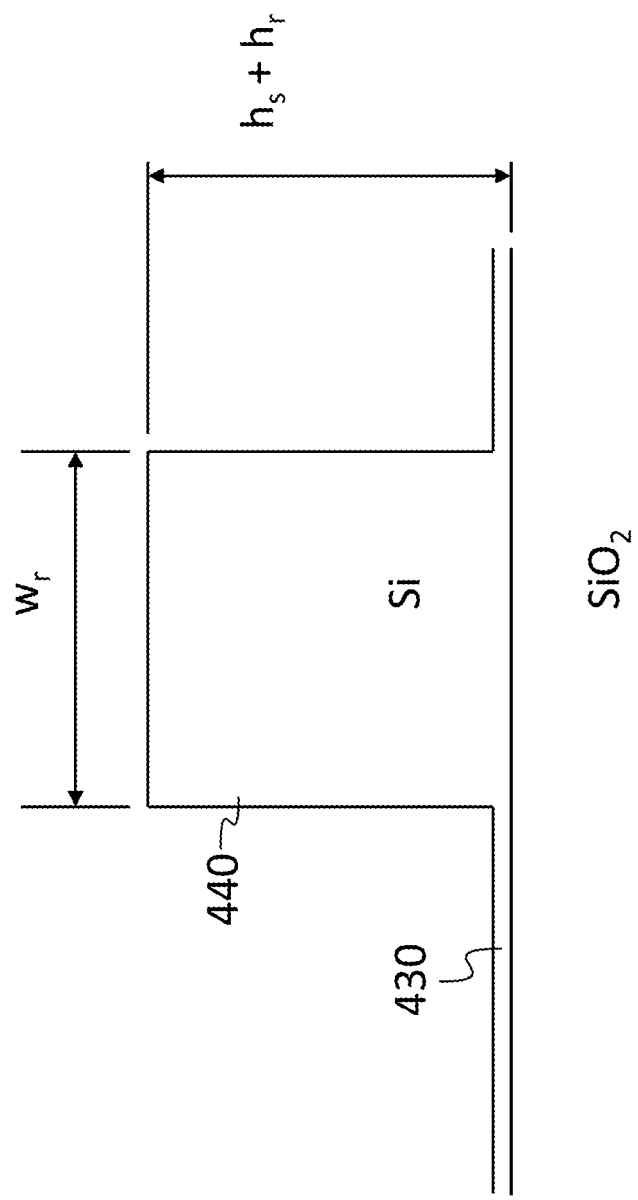
FIG. 4B is a cross section of a strip waveguide, according to an embodiment of the present invention.
Figure 4C:
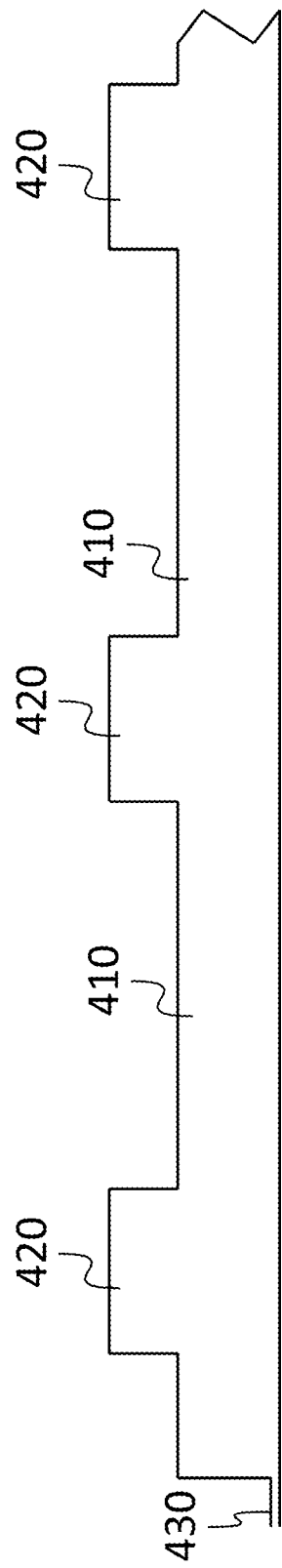
FIG. 4C is a cross section of a portion of an array of rib waveguides on a shared slab, according to an embodiment of the present invention.

Within the bends, and within the straight sections 325, 335, 345, 355, 365, the waveguides may be strip waveguides, as illustrated in FIG. 4B, including a strip 440 and lacking a slab portion. The strip may have a height equal to the combined height of slab portion 410 and rib portion 420, i.e., a height of $h_s + h_r$. The strip waveguides may be suitable for forming tight (<200 micron, or even tighter) bend radii without unacceptable optical loss and with minimal coupling from the fundamental modes into higher order modes. They may also be multi-mode waveguides.

Tapering, i.e., gradual changes in the cross section along the length of the waveguide, may be used to transition between rib and strip waveguides, and to transition to wide rib cross sections that may provide improved coupling to the free propagation regions of the star couplers 130, 150. Each transitions between rib waveguides strip waveguides may be referred to as a "rib to strip converter", having a "rib end" connected to a rib waveguide, and a "strip end" connected to a strip waveguide. Each rib to strip converter may include a region in which the slab portion 410 of each of the rib waveguides tapers to become progressively narrower until it is the same width as the corresponding rib portion 420 and is no longer distinct from the rib portion 420. To the extent that higher order modes are suppressed by the curved portions 310, 380, and that the rib to strip converters do not couple light into higher order modes, the light coupled into the strip waveguides of the bends may be entirely in the fundamental modes. The coupling of light into the rib to strip converters may be reduced by fabricating the rib to strip converters to be straight (i.e., not curved) sections of waveguide; for example, the rib to strip converters may be formed in the second straight section 315 and the eighth straight section 375.

Figure 4D:
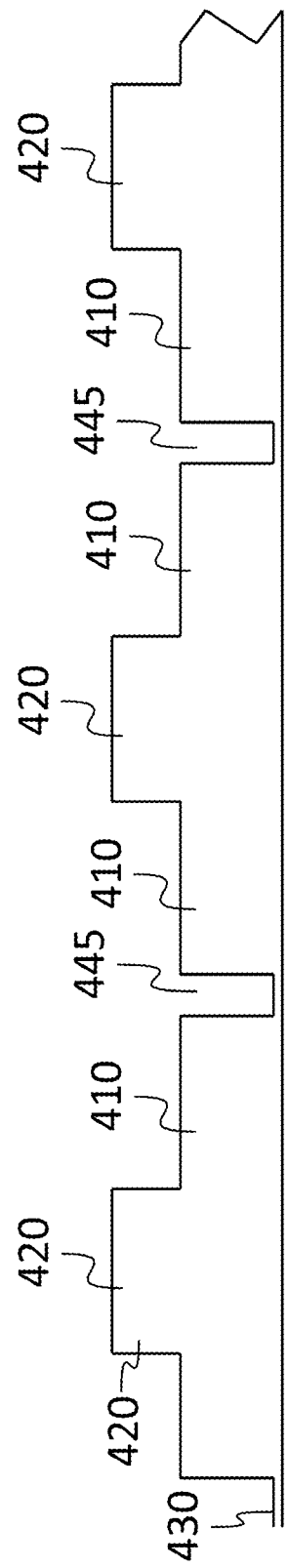
FIG. 4D is a portion of a cross section of a rib to strip converter, according to an embodiment of the present invention.

FIG. 4C shows a cross section of a portion of the waveguide array on the rib end of a rib to strip converter. In the embodiment of FIG. 4C, the rib waveguides share a slab portion 410. FIG. 4D shows a cross section of a portion of the waveguide array at a point within the rib to strip converter. A trench 445 that extends nearly to the bottom of the slab portion, half-way between each pair of adjacent ribs, begins at the rib end of the rib to strip converter and then widens in the direction of the strip end of the rib to strip converter.

Each waveguide of the waveguide array may have a curvature that is adiabatic along the length of the waveguide, i.e., a rate of change of curvature that does not exceed a set value, e.g., a value in a range from $1/mm^2$ to $20/mm^2$, e.g., $5/mm^2$, $10/mm^2$, or $15/mm^2$. As used herein, the "curvature" of the waveguide is the reciprocal of the radius of curvature. For example, portions (such as the curved sections 310, 380, and the bends 320, 330, 340, 350, 360, 370) of each waveguide of the waveguide array may have the shape of a portion of an Euler spiral, which follows a curve for which the rate of change of curvature with distance along the curve is constant. For example, a curved portion of a waveguide of the waveguide array may have the shape of an Euler arc, which consists of two symmetric portions of an Euler spiral. As used herein, an "Euler arc" (or "Euler bend") is symmetric about its midpoint, has a curvature that is greatest at its midpoint and vanishes at each of the two ends of the Euler arc, and that changes at a constant rate in each half of the Euler arc, the rate of change of curvature being equal in magnitude, and opposite in sign, in the two halves of the Euler arc. The term "Euler curve" is used herein to refer to any portion, of an Euler spiral, that has a vanishing curvature at one end.

The absence of discontinuities in the curvature of the waveguide may prevent coupling into higher order modes that otherwise may occur at such a discontinuity. Moreover, as mentioned above, a curved section of rib waveguide (as, e.g., the curved sections 310, 380) may act as a mode filter, effectively confining only the fundamental (TEO and TMO) modes.

Waveguides fabricated using photolithography or other fabrication techniques employed to fabricate photonic integrated circuits may have walls with small-scale (e.g., nm-scale) roughness. This roughness may result in each wall of the waveguide having a local curvature, on a small scale, that is relatively large and fluctuates significantly along the length of the waveguide. This local roughness, however, may have relatively little effect on the propagation of light in the waveguide, and on the coupling between fundamental modes and leaky higher order modes. Accordingly, the curvature of a waveguide (as distinct from the local curvature of a wall of the waveguide) is defined herein as the curvature of that would be measured if the small-scale roughness of the waveguide is disregarded. The curvature of a waveguide may be measured, for example, with an optical microscope, which may be insensitive to features (such as waveguide wall roughness) that are significantly smaller than the wavelength of visible light.

Although a 5×8 arrayed waveguide grating is illustrated in FIG. 3, having 5 waveguides at the external end of the first star coupler 130 and 8 waveguides at the external end of the second star coupler second, other embodiments may be fabricated in an analogous manner to be M×N arrayed waveguide gratings, having M first waveguides and N second waveguides, with M and N having integer values that may differ from 5 and 8 respectively, and may be as small as 1. Similarly, further embodiments may be fabricated to be cyclic N×N arrayed waveguide gratings or non-cyclic N×N arrayed waveguide gratings. Embodiments of the invention may be fabricated in any high index contrast system suitable for forming tight 90 degree bends, e.g., silicon on insulator (SOI), indium phosphide (InP), or silicon nitride/silicon dioxide ($SiN/SiO_2$).

Figure 5:
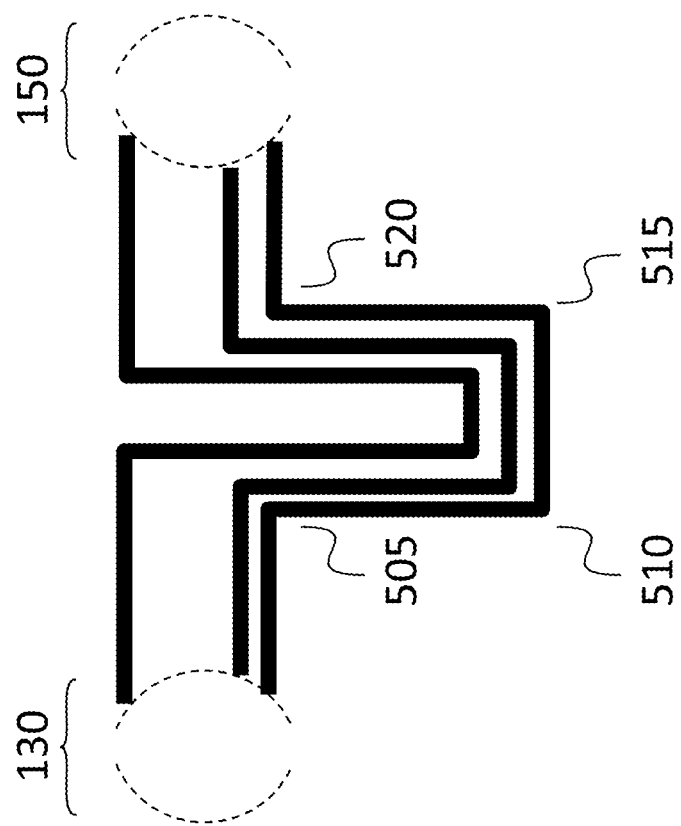
FIG. 5 is a schematic drawing of a T-shaped arrayed waveguide grating, according to an embodiment of the present invention.
Figure 6B:
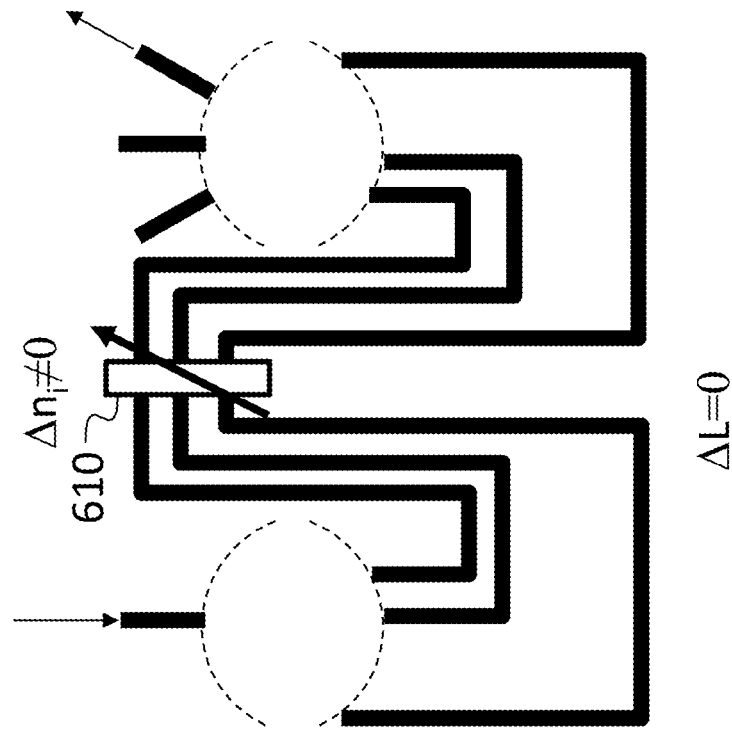
FIG. 6B is a schematic drawing of a tunable T-shaped arrayed waveguide grating, according to an embodiment of the present invention.
Figure 6A:
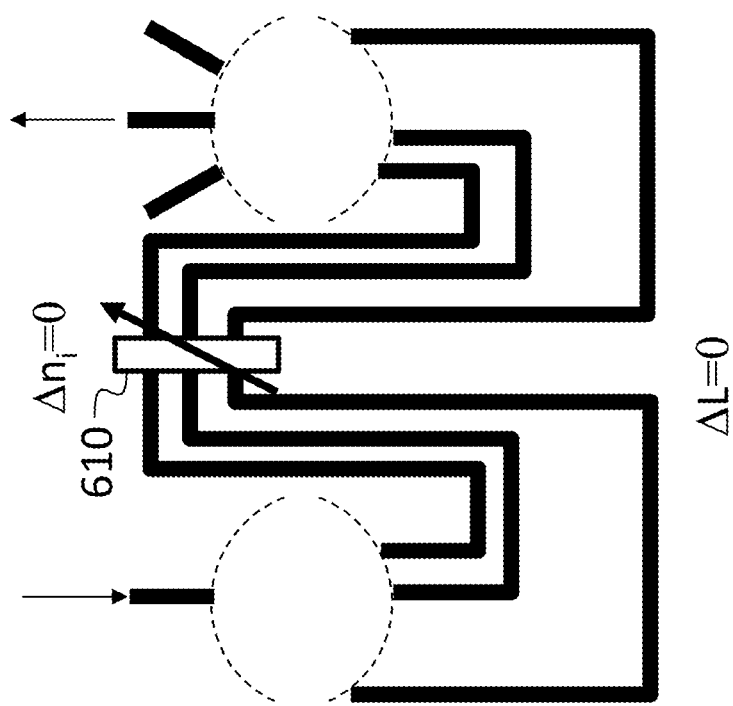
FIG. 6A is a schematic drawing of a tunable T-shaped arrayed waveguide grating, according to an embodiment of the present invention.

FIG. 5 shows a schematic view of a T-shaped arrayed waveguide grating that lacks the two outermost bends (e.g., that lacks the first and fourth clockwise bends 320, 370) of the embodiment of FIG. 3, but is otherwise analogous. FIGS. 6A and 6B show a tunable T-shaped arrayed waveguide grating including a tuning section 610. In the tuning section 610, each waveguide of a subset of the waveguides (the subset either including all of the waveguides, or being a proper subset, and including, e.g., all but one of the waveguides) includes a waveguide section within which the effective index of refraction may be adjusted, e.g., using temperature tuning (using an individual heater on each waveguide or a global heater with gradient heat profile) or using a phase modulator in each waveguide of the subset. In this manner, if the lengths of the waveguides are all the same, then when the tuning section 610 is adjusted so that all of the waveguide sections have the same effective index of refraction (so that the effective lengths are also all the same, i.e., the effective length difference is zero for any pair of waveguides), monochromatic light fed into the central input will exit from the central output (as shown in FIG. 6A). If the tuning section 610 is adjusted so that the waveguide sections do not all have the same effective index of refraction (e.g., so that there is a difference in effective length, that is the same between any pair of adjacent waveguides), then monochromatic light fed into the central input may exit from another output (as shown in FIG. 6B). A tunable T-shaped arrayed waveguide grating such as that of FIGS. 6A and 6B may also be used as an arrayed waveguide grating with a tunable, and arbitrary large, free spectral range.

An arrayed waveguide grating (or, more generally a multi-path interference filter, as discussed in further detail below) may be designed so that the optical path delay difference between a first waveguide and a second waveguide of the arrayed waveguide grating (i.e., the difference between (i) the phase delay incurred by propagation along the first waveguide and (ii) the phase delay incurred by propagation along the second waveguide) has a certain design value (e.g., a value depending on the desired center wavelength $\lambda_c$, and on the desired grating order m (m being an integer) which in turns depends on the desired FSR of the device). This design criterion may be written:

$$(L_2 - L_1) = m\frac{\lambda_c}{n},$$

which in turns results in a phase difference:

$$\frac{2\pi n}{\lambda_c}(L_2 - L_1) = m2\pi, \tag{1}$$

where $L_1$ and $L_2$ are the lengths of the first and second waveguides respectively, and n is the effective index of refraction of the waveguides.

Figure 7:
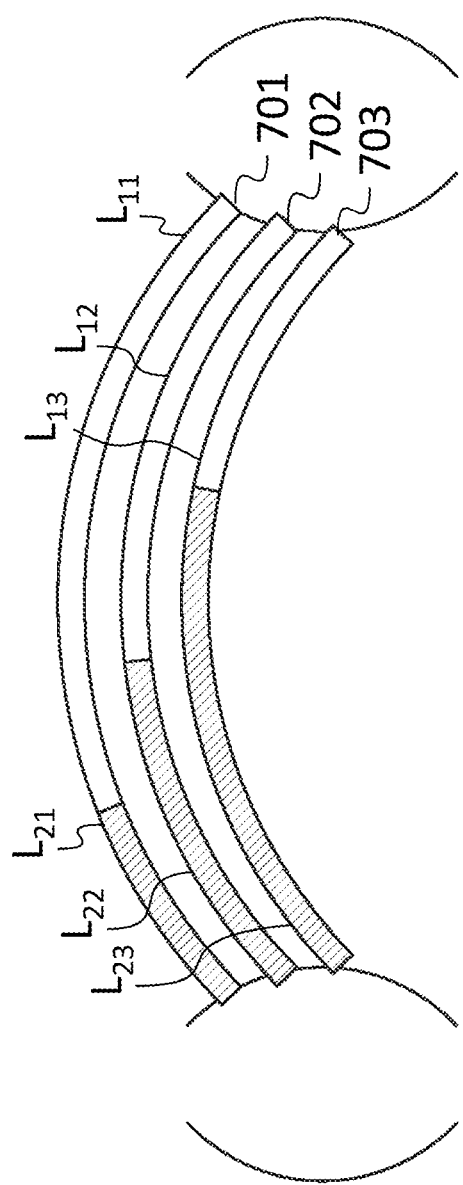
FIG. 7 is a schematic drawing of an athermal arrayed waveguide grating, according to an embodiment of the present invention.

Changes, with temperature, in the index of refraction of an arrayed waveguide grating may result in changes in the characteristics of the arrayed waveguide grating, e.g., in the center wavelengths of the channels, and this may, in turn, result in a degradation in system performance. Accordingly, in some embodiments the effects of temperature changes are reduced, in a device referred to as an athermal arrayed waveguide grating, by using sections of waveguide having different thermo-optic coefficients. As used herein, the "thermo-optic coefficient" of a waveguide is the rate of change of the waveguide's effective index of refraction with temperature. Referring to FIG. 7, each waveguide of an arrayed waveguide grating may include a first portion having a first effective index of refraction $n_1$, and a first thermo-optic coefficient $$\frac{dn_1}{dT},$$

and a second portion having a second effective index of refraction $n_2$, and a second thermo-optic coefficient $$\frac{dn_2}{dT}.$$

The lengths of the respective first and second portions may differ from waveguide to waveguide. For example, a first waveguide 701 may have a first portion with a length $L_{11}$ and a second portion with a length $L_{21}$, a second waveguide 702 may have a first portion with a length $L_{12}$ and a second portion with a length $L_{22}$, and a third waveguide 703 may have a first portion with a length $L_{13}$ and a second portion with a length $L_{23}$. Equation (1) may then be generalized as follows:

$$\frac{2\pi}{\lambda_c}[n_1(L_{12} - L_{11}) + n_2(L_{22} - L_{21})] = m2\pi. \tag{2}$$

If, for any pair of waveguides (e.g., for the pair of waveguides consisting of the first waveguide 701 and the second waveguide 702), the following equation is also satisfied:

$$\frac{dn_1}{dT}\Delta L_1 + \frac{dn_2}{dT}\Delta L_2 = 0, \tag{3}$$

the first order temperature effect (i.e., the rate of change, with temperature, of the difference between (i) the optical delay through the first waveguide 701 and (ii) the optical delay through the second waveguide 702) may vanish. In Equation (3), $\Delta L_1$ is the difference between the lengths of the respective first portions and $\Delta L_2$ is the difference between the lengths of the respective second portions. For example, for the first waveguide 701 and the second waveguide 702 $\Delta L_1 = L_{12} - L_{11}$ and $\Delta L_2 = L_{22} - L_{21}$. From Equation (3) it may be seen that if the thermo-optic coefficients have the same sign (i.e., if $$\frac{dn_1}{dT}\frac{dn_2}{dT} > 0),$$

then $\Delta L_1$ and $\Delta L_2$ have opposite signs (i.e., $\Delta L_1 \Delta L_2 < 0$).

If, as may be the case for an arrayed waveguide grating, the difference between (i) the total optical delay of the first waveguide 701 and (ii) the total optical delay of the second waveguide 702 is the same as the difference between (i) the total optical delay of the second waveguide 702 and (ii) the total optical delay of the third waveguide 703, then Equation (3) may be satisfied for the pair of waveguides consisting of the second waveguide 702 and the third waveguide 703 for the same values of $\Delta L_1$ and $\Delta L_2$, i.e., Equation (3) may be satisfied for this pair of waveguides if $L_{13} - L_{12} = \Delta L_1$ and $L_{23} - L_{22} = \Delta L_2$.

Figure 8:
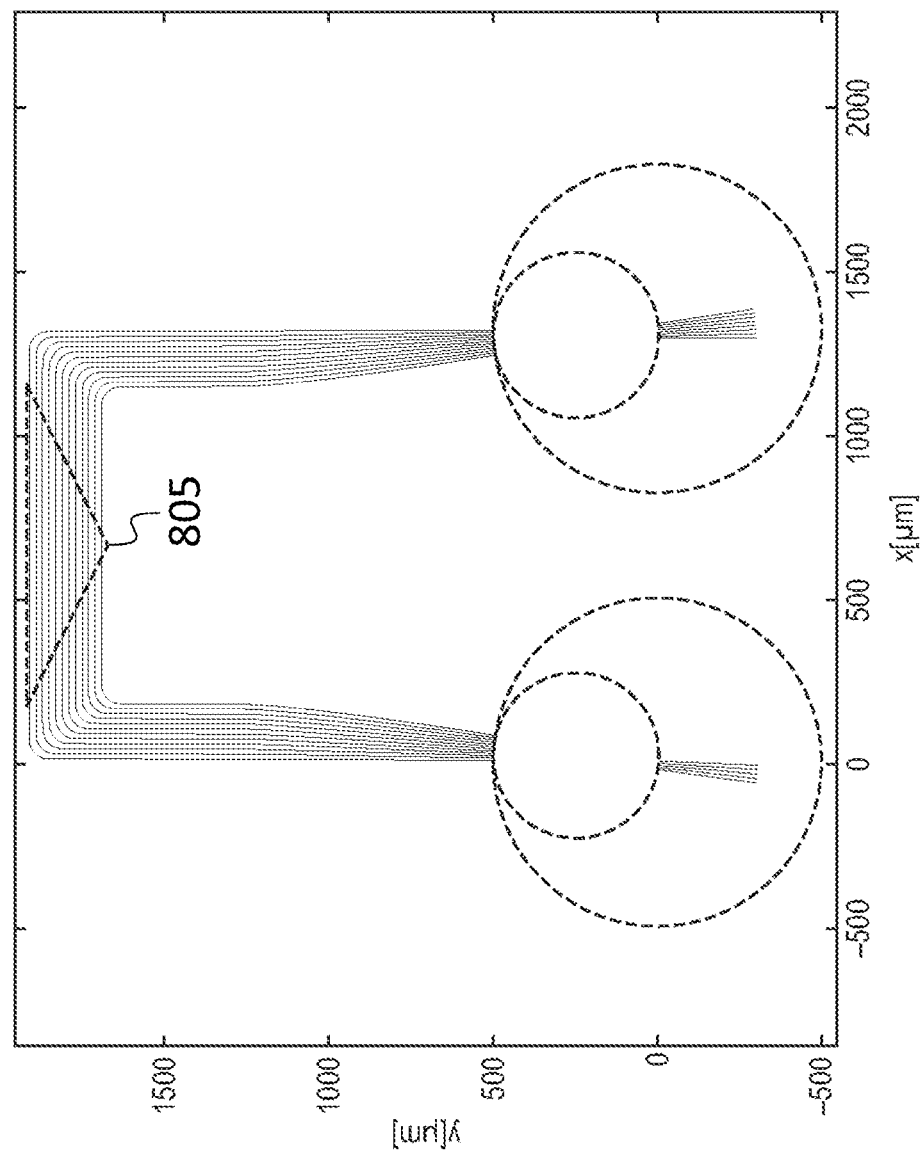
FIG. 8 is a drawing of an athermal arrayed waveguide grating, according to an embodiment of the present invention.

In some embodiments, an athermal arrayed waveguide grating may be constructed using waveguides having portions composed of crystalline silicon (c-Si) and portions composed of silicon nitride (SiN). The crystalline silicon portions may have a thermo-optic coefficient of 1.84e-4/° C., and the silicon nitride portions may have a thermo-optic coefficient of 2.45e-5/° C. FIG. 8 shows an example of a rectangular arrayed waveguide grating design using waveguides composed of crystalline silicon, except in a triangular region 805, in which they are composed of silicon nitride. A design such as that of FIG. 8 may have a vanishing first order temperature effect, at an operating temperature for which it is designed. Fabricating a device like that of FIG. 8 may be challenging, however, because of challenges that arise in fabricating silicon nitride structures with a thickness suitable for waveguides, and in integrating such structures with the crystalline silicon structures of the remainder of the arrayed waveguide grating. Moreover, the relatively large mismatch between the index of refraction of silicon nitride and the index of refraction of crystalline silicon may limit the performance of an arrayed waveguide grating fabricated from these materials.

Figure 9:
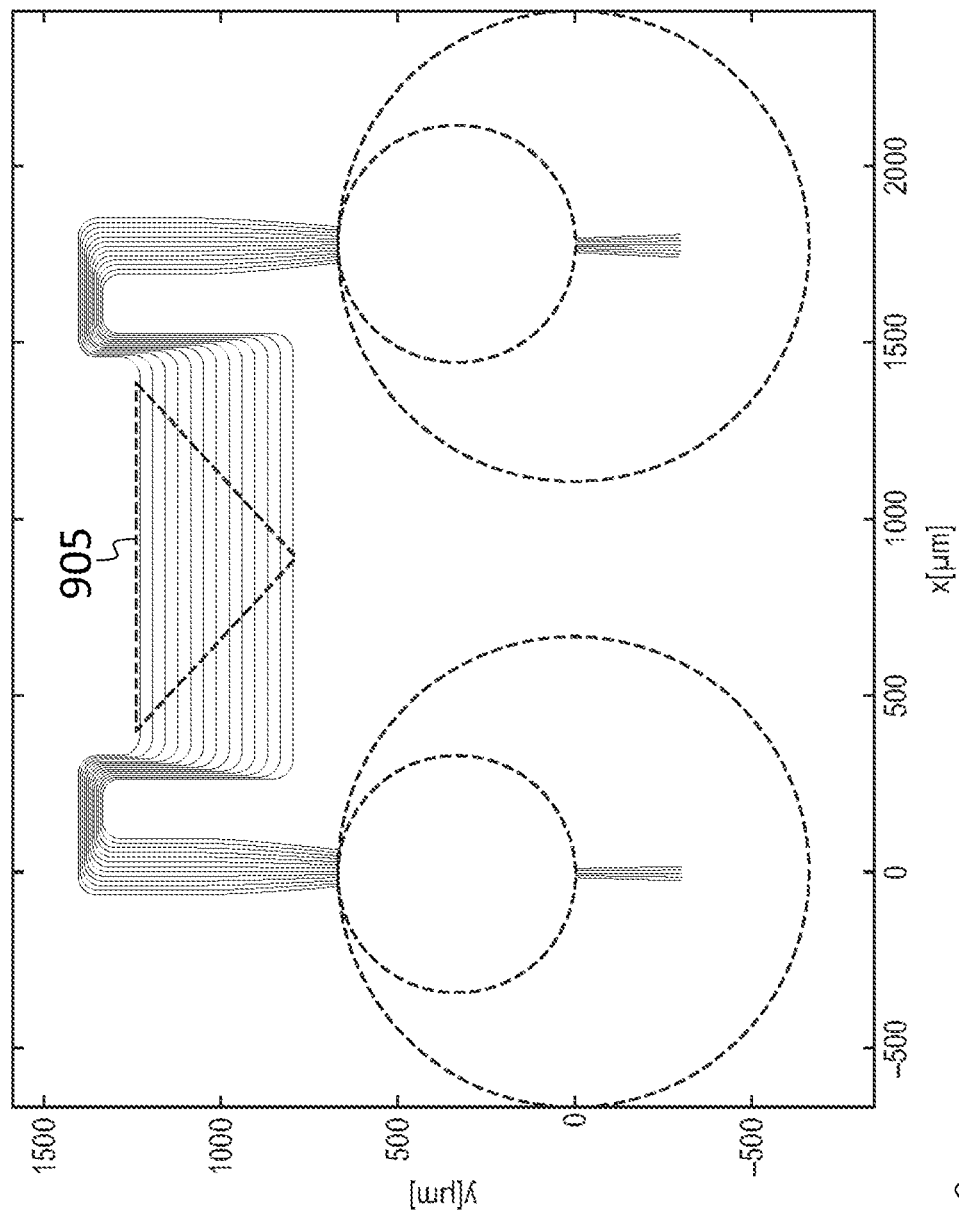
FIG. 9 is a drawing of an athermal arrayed waveguide grating, according to an embodiment of the present invention.
Figure 10:
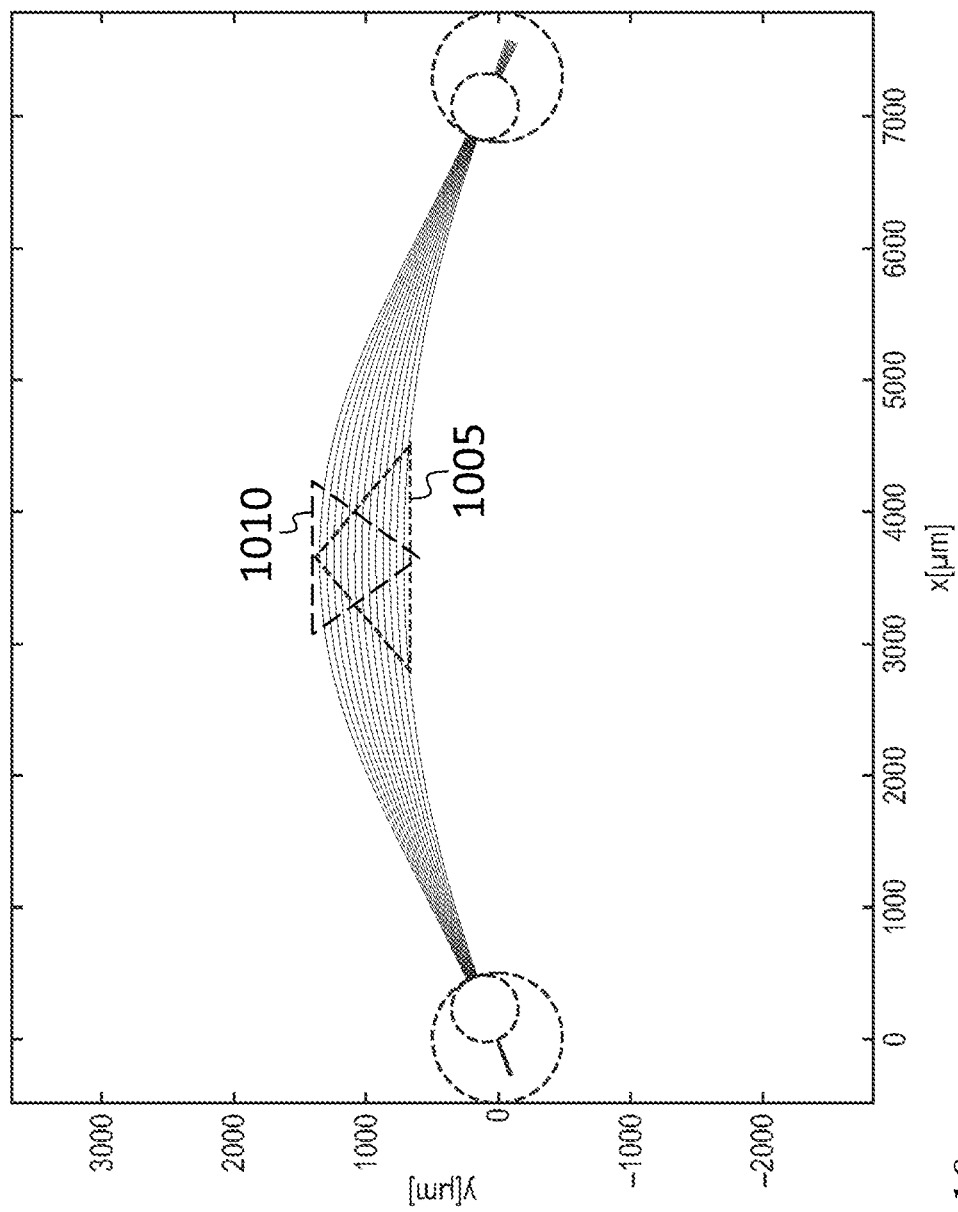
FIG. 10 is a drawing of an athermal arrayed waveguide grating, according to an embodiment of the present invention.

In other embodiments, an athermal arrayed waveguide grating may instead be constructed using waveguides having portions composed of crystalline silicon and portions composed of hydrogenated amorphous silicon (a-Si:H). The hydrogenated amorphous silicon portions may have a thermo-optic coefficient of 2.3e-4/° C. The relatively small difference between the thermo-optic coefficient of crystalline silicon and the thermo-optic coefficient of hydrogenated amorphous silicon may be an obstacle to constructing a rectangular athermal arrayed waveguide grating from these materials, but a T-shaped arrayed waveguide grating, such as that shown in FIG. 9, or a horseshoe shaped arrayed waveguide grating, such as that shown in FIG. 10, may be fabricated from these materials. In each of the embodiments of FIGS. 9 and 10, the waveguides of the arrayed waveguide grating are composed of crystalline silicon except in respective triangular regions 905, 1005, in which they are composed of hydrogenated amorphous silicon. These devices may be fabricated, from a wafer having a crystalline silicon upper surface, by first replacing the crystalline silicon in a triangular region with hydrogenated amorphous silicon, and then masking and etching the waveguides and star couplers of the arrayed waveguide grating structure in subsequent steps.

For example, in some embodiments, a mask (e.g., an oxide hard mask) having an aperture of a suitable shape and size (e.g., a triangular aperture) is formed on the upper layer of silicon of a silicon on insulator (SOI) wafer. A corresponding (e.g., triangular) cavity is then etched into the top surface of the SOI wafer using a suitable etching process (e.g., a reactive ion etching process or another inductively coupled plasma process). This etch may remove, in the region of the mask aperture, the upper layer of silicon of the SOI wafer (down to the buried oxide (BOX) layer of the SOI wafer). In some embodiments, another mask, having an aperture slightly larger than the aperture of the oxide hard mask, may then be formed on the SOI wafer, and hydrogenated amorphous silicon may be deposited on the SOI wafer. The mask may then be removed, leaving a layer of hydrogenated amorphous silicon filling the cavity and overlapping onto the oxide hard mask in a strip around the perimeter of the cavity. In other embodiments, one of various different processes may be employed, For example, after the cavity is formed, hydrogenated amorphous silicon may be deposited over the entire wafer, and CMP may then be performed to remove it except from within the cavity. The hydrogenated amorphous silicon may be deposited using, for example, plasma-enhanced chemical vapor deposition (PECVD) using $SiH_4$ at a flow rate of 70 standard cubic centimeters per minute (sccm), argon at 210 sccm, a substrate temperature of 300° C., a pressure of 500 mTorr, radio frequency (RF) power of 250 W, an RF frequency of 380 kHz, and a deposition rate of 96 nm per minute.

The characteristics of the deposited hydrogenated amorphous silicon may vary, depending on the process and process parameters used to deposit it. In some embodiments, a variant of the process described above may be used, in which a different value is used for one or more of the parameters listed (e.g., a different flow rate, a different temperature, or a different RF power or frequency). In some embodiments RF power at two or more frequencies is applied during the PECVD process (and the power at all frequencies may not be the same). The process may be adjusted empirically to achieve one or more of several objectives for the characteristics of the deposited hydrogenated amorphous silicon, including (i) low stress (e.g., less than +/−50 MPa) (to avoid stress induced birefringence and unacceptable bowing of the wafer), (ii) an index of refraction similar to that of (e.g., within 10% of that of) crystalline silicon (to avoid high loss at interfaces), (iii) as large as possible a thermo-optic coefficient (i.e., differing as much as possible from that of crystalline silicon, making possible the design of small devices), (iv) low optical loss, and (v) ability to withstand high temperatures in subsequent processing steps, without unacceptable hydrogen out-diffusion. In some embodiments, once a process has been selected (and process parameters have been selected) for depositing the hydrogenated amorphous silicon, the optical characteristics (e.g., the index of refraction, the thermo-optic coefficient, and higher-order characteristics such as the rate of change of the thermo-optic coefficient with temperature or with wavelength) may be measured from a test film deposited using the process, and the dimensions of portions of hydrogenated amorphous silicon in the device to be fabricated may then be selected so that acceptable temperature compensation is achieved in the device. This approach may be employed, provided the process for depositing the hydrogenated amorphous silicon produces hydrogenated amorphous silicon with repeatable characteristics, even if the dependence of the characteristics of the hydrogenated amorphous silicon on the process parameters is not fully understood.

In some embodiments the shape of the hard mask is chosen to produce angled interfaces between the waveguide portions composed of hydrogenated amorphous silicon and the waveguide portions composed of crystalline silicon, to reduce the effect of reflections (by avoiding the production of reflections that are mode-matched to the waveguides). In some embodiments each interface between a waveguide portion composed of hydrogenated amorphous silicon and a waveguide portion composed of crystalline silicon is a substantially planar surface having a surface normal that is at an angle greater than or equal to 0 degrees and less than 30 degrees with respect to the longitudinal direction of one or both of the two waveguide portions. The angles of the interfaces between the waveguide portions composed of hydrogenated amorphous silicon and the waveguide portions composed of crystalline silicon may be a consequence of slopes of the edges of the aperture in the oxide hard mask (e.g., each interface may be parallel to an edge of the triangle, if a mask with a simple triangular aperture is used), or the mask aperture may have edges each including a plurality of straight segments, a segment at each point where a waveguide will be formed having a direction corresponding to a design interface angle.

A total thickness of hydrogenated amorphous silicon exceeding the thickness of the upper layer of silicon of the SOI wafer may be deposited (e.g., 5 microns of hydrogenated amorphous silicon may be deposited, on an SOI wafer for which the upper layer of silicon has a thickness of 3 microns). Chemical mechanical polishing (CMP) may then be used to remove the excess hydrogenated amorphous silicon, so that the remaining hydrogenated amorphous silicon just fills the cavity, and so that the upper surface of the hydrogenated amorphous silicon is flush with the upper surface of the surrounding oxide hard mask. The oxide hard mask may also be used as an etch stop for the CMP process. The oxide hard mask may be removed in a subsequent processing step.

Waveguides may then be etched in two steps (which may be performed in either order): (i) in one step the region of hydrogenated amorphous silicon may be masked off and waveguides (and, e.g., star couplers) may be formed by suitable etching of the upper layer of silicon of the SOI wafer, and (ii) in another step, the upper layer of silicon of the SOI wafer may be masked off and waveguides (or other structures) may be formed by suitable etching of the hydrogenated amorphous silicon. In some embodiments, a self aligned process is used, in which an oxide hard mask is patterned to define continuous crystalline silicon and hydrogenated amorphous silicon waveguides (i.e., continuous waveguides having portions of each material), and the hard mask is then further covered in resist during two separate subsequent waveguide etching steps for crystalline silicon and hydrogenated amorphous silicon respectively. In some embodiments the etch process used for these two steps is the same (e.g., an inductively coupled plasma process), and the steps are performed separately because the etch rate achieved by the process is different for hydrogenated amorphous silicon than it is for crystalline silicon. Any registration error between the masks used for the two etch steps may result in some degradation in the performance of the resulting structure, but the degradation may be acceptable or insignificant if the registration errors are small (e.g., about +/−200 nm or less). Subsequent processing steps involving high temperatures (e.g., temperatures exceeding 350° C.) may be avoided, to avoid an increase in optical propagation loss (e.g., due to hydrogen out-diffusion) within the hydrogenated amorphous silicon portions of the structure.

The dimensions of the triangular regions 905, 1005 may be selected, using Equations (2) and (3), to cause the first order temperature effect to vanish. Such an approach may be appropriate when the operating temperature range is sufficiently small that higher order effects may remain small. In some embodiments the shape of the region within which the waveguides are composed of a different material is not an isosceles triangle as shown, but is instead a triangle that lacks the symmetry of an isosceles triangle, or a shape that is not a triangle (e.g., one in which one or more of the sides of the triangle 905 have been replaced with curved lines) while preserving propagation lengths within the different materials that satisfy Equation (2), and that satisfy Equation (3) (or a similar requirement for applications in which higher order effects are significant, as discussed in further detail below). In some embodiments, one waveguide of an array has no hydrogenated amorphous silicon portion; in other embodiments, one waveguide has a short hydrogenated amorphous silicon portion which is included so that each waveguide of the waveguide array includes two interfaces between crystalline silicon portions and hydrogenated amorphous silicon portions, so that losses produced by these interfaces are largely the same in all of the waveguides. Such balancing of losses may be of greater importance in other devices (e.g., in a generalized Mach-Zehnder interferometer, discussed below) than in an arrayed waveguide grating.

In some embodiments, if the operating temperature range is sufficiently large that higher order effects (e.g., second order effects, such as a change in the thermo-optic coefficient with temperature) are significant, another figure of merit may be used (instead of designing for a sufficiently small or vanishing first order temperature effect) to design the dimensions (and shape, if it is permitted to deviate from a triangular shape) of the region within which the waveguides are composed of a material (e.g. hydrogenated amorphous silicon) other than crystalline silicon. For example, the maximum change in the center wavelength of any channel over the operating temperature range may be used as a figure of merit. Simulations show that for the embodiment of FIG. 9, which has a channel spacing of about 0.8 nm, the maximum change in the center wavelength of any channel over the temperature range extending from 20° C. to 70° C. may be as little as 250 pm, whereas for a similar structure in which the waveguides of the arrayed waveguide grating are composed entirely of crystalline silicon, the maximum change in the center wavelength may be 4 nm.

It may be advantageous for an arrayed waveguide grating to have polarization-independent characteristics. For the embodiment of FIG. 9, the portions of each waveguide which are strip waveguides with substantially square cross sections (which include the portions composed of hydrogenated amorphous silicon) may inherently have low birefringence. The portions of each waveguide which are rib waveguides may have significant birefringence, but the effect of the birefringence may (i) be the same in each waveguide of the array, if the rib waveguide portions have the same lengths and shapes (and the behavior of the device may therefore be polarization independent) or (ii) be compensated when a layer of thermal oxide 1010 (FIG. 10) is formed on top of a silicon rib waveguide structure, as it induces a physical stress that affects the relative transmission of the TM and TE polarizations in an opposite way to the overall effect of the sources of birefringence inherent in the silicon rib waveguide.

Figure 11A:
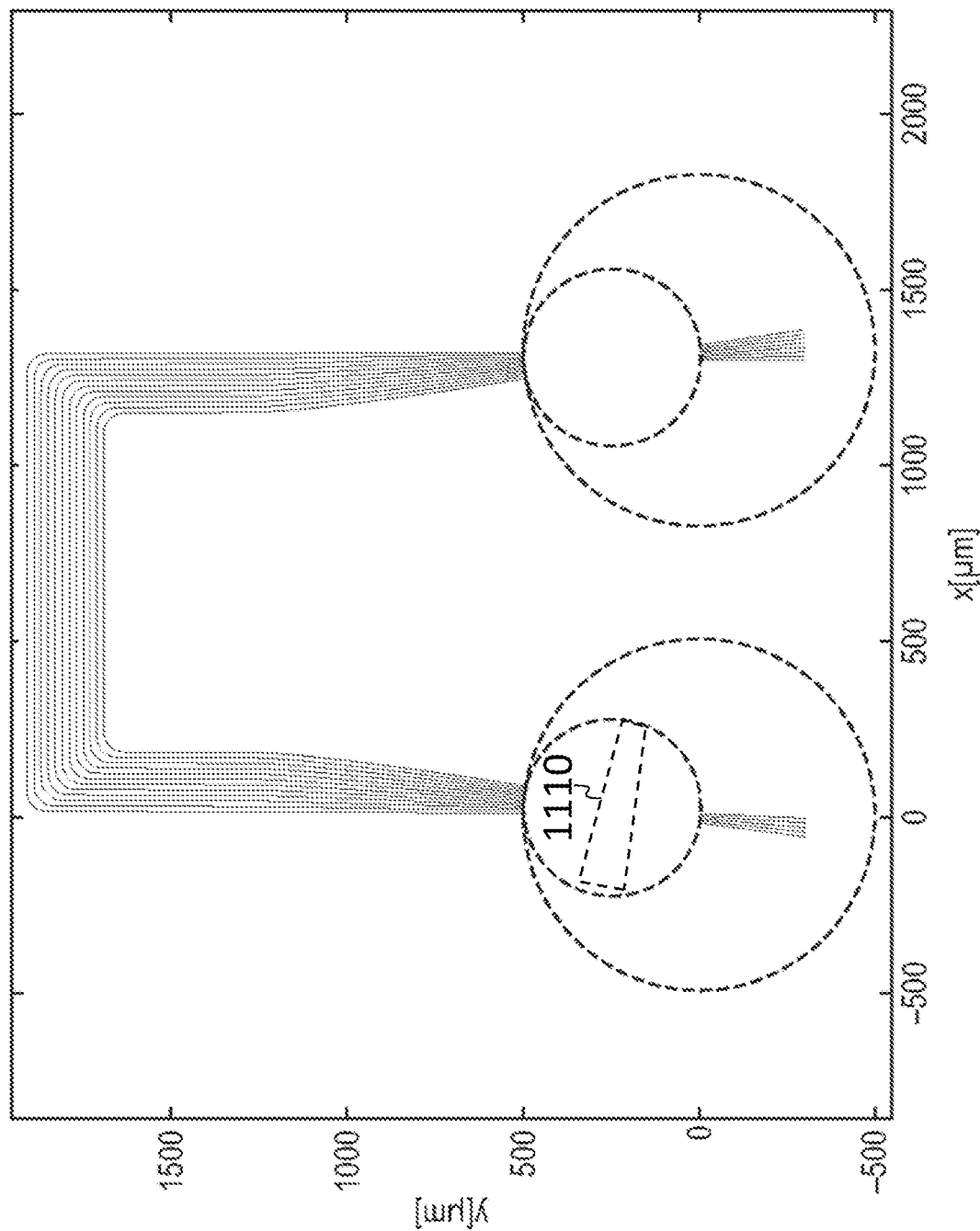
FIG. 11A is a drawing of an athermal arrayed waveguide grating, according to an embodiment of the present invention.
Figure 11B:
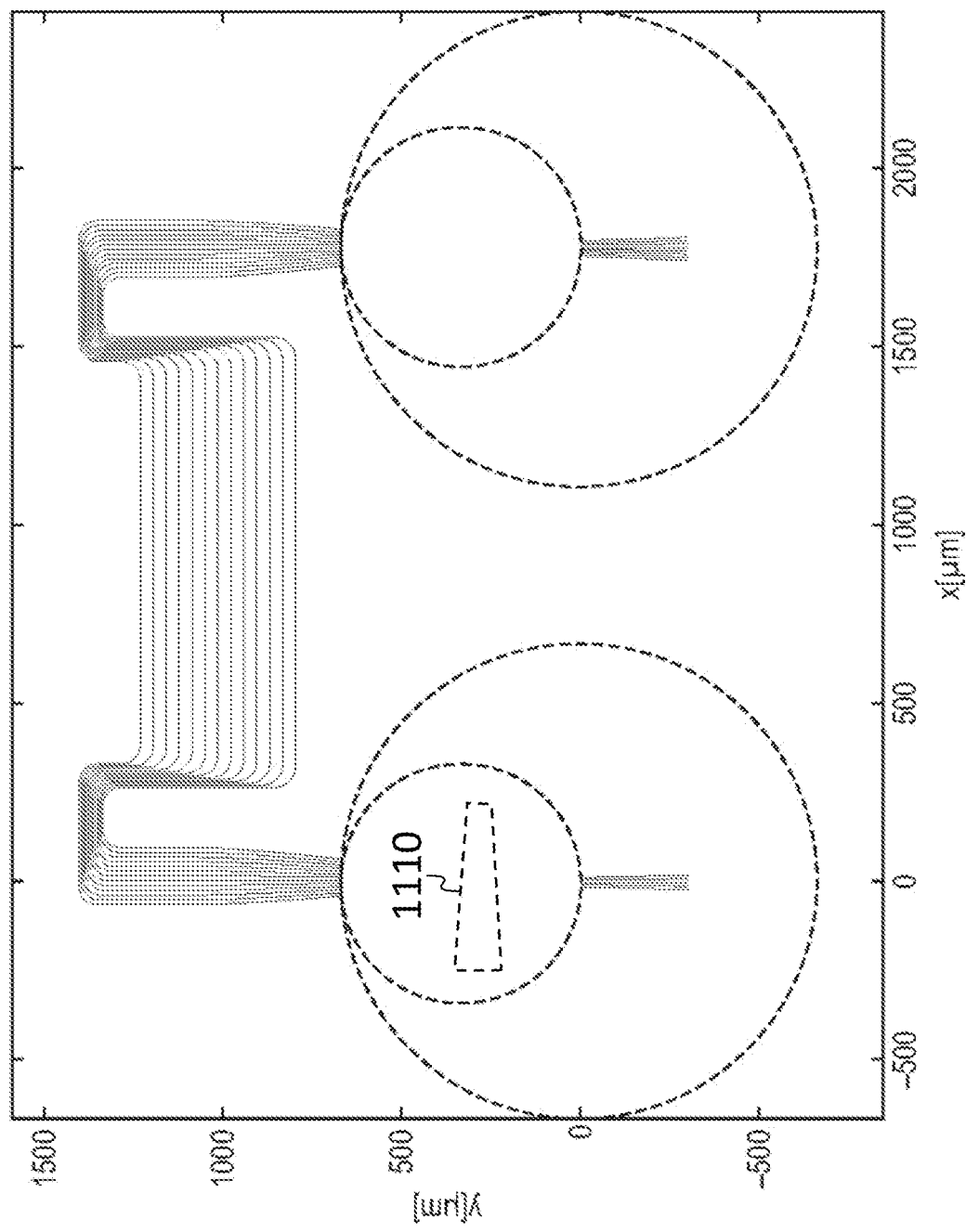
FIG. 11B is a drawing of an athermal arrayed waveguide grating, according to an embodiment of the present invention.

Referring to FIGS. 11A and 11B, in some embodiments, an athermal arrayed waveguide grating may be constructed using one or more areas 1110 of hydrogenated amorphous silicon, in one or both of the free propagation regions of the star couplers. Each such area 1110 may have a wedge-shaped portion within the free propagation region (the area 1110 may be wedge-shaped as shown, or, for example, triangular) so that the optical paths, through two different waveguides of the waveguide array, from a port waveguide of one of the star couplers to a port waveguide of the other star coupler, include different lengths within the area 1110. Such areas 1110 of hydrogenated amorphous silicon may be used instead of, or in addition to, hydrogenated amorphous silicon portions in the otherwise crystalline silicon waveguides. The dimensions of the area or areas may be determined from Equation (3) above, with the quantities $\Delta L_1$ and $\Delta L_2$ defined to include paths within the free propagation region (or regions) of the star coupler (or star couplers) containing such areas 1110.

Embodiments of the present invention may be used not only in arrayed waveguide gratings but also in any other optical device, such as a multi-path interference filter, in which differential delays may be affected by temperature changes, and in which controlling the effects of such temperature effects may be advantageous. As used herein, a "multi-path interference filter" is any optical device which selects wavelengths by dividing one input optical field received at a first port waveguide (e.g., an input waveguide) into two or more intermediate optical paths having different optical path lengths and by recombining the intermediate optical paths into an output field at a second port waveguide (e.g., an output waveguide) that is modified by interference between the intermediate paths. The first port waveguide may be followed by a first optical power splitter, which divides the input stream into intermediate optical paths which are recombined by a second optical power splitter (operating as a combiner), followed by the second port waveguide; as such, the optical device includes at least two different optical paths from the first port waveguide to the second port waveguide. Examples of multi-path interference filters include Mach-Zehnder filters. Such a filter may include a splitter, that splits input light to a plurality of waveguides, and a combiner that recombines the light after portions of the light have propagated through respective ones of the waveguides. The attenuation and relative delay of the waveguides may be selected for a desired filter response. The waveguides may be athermalized according to embodiments of the present invention, e.g., by including in each waveguide one or more portions composed of crystalline silicon and one or more portions composed of hydrogenated amorphous silicon. In such an athermalized device, the rate of change with temperature of the optical path delay difference between two different paths between the first port waveguide and the second port waveguide, at a wavelength of 1550 nm, may be less than 2e-4 radians/° C., e.g., it may be less than 4e-5 radians/° C. or less than 4e-6 radians/° C., or less. In some embodiments the maximum change, in the optical path delay difference, at a wavelength of 1550 nm, over the temperature range extending from 20° C. to 70° C., is less than 1e-2 radians, e.g., it may be less than 2e-3 radians, or less than 2e-4 radians, or less.

Figure 12A:
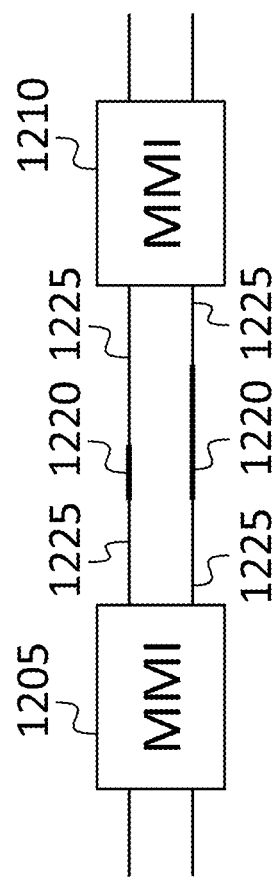
FIG. 12A is a schematic drawing of an athermal Mach-Zehnder interferometer, according to an embodiment of the present invention.

For example, referring to FIG. 12A, a Mach-Zehnder interferometer may include a first coupler (e.g., a multi-mode interference (MIMI) coupler) 1205, a second coupler (e.g., an MMI coupler) 1210, and two waveguides, each of the waveguides having one or more portions 1220 composed of hydrogenated amorphous silicon and one or more portions 1225 composed of crystalline silicon. In the schematic drawing of FIG. 12A, the total lengths of the two waveguides are illustrated to be equal, although in some embodiments they are unequal. The lengths of portions 1220 composed of hydrogenated amorphous silicon and the lengths of portions 1225 composed of crystalline silicon may be selected to satisfy Equation (2) and to satisfy Equation (3) (or a similar requirement for applications in which higher order effects are significant).

Figure 12B:
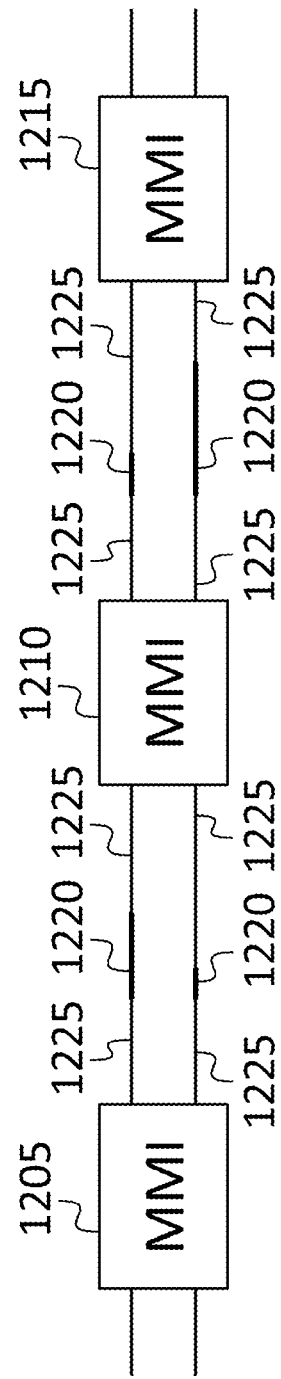
FIG. 12B is a schematic drawing of an athermal lattice filter, according to an embodiment of the present invention.

Referring to FIG. 12B, a lattice filter may be formed by concatenating a plurality of Mach-Zehnder interferometers, as shown, with each pair adjacent Mach-Zehnder interferometers sharing a coupler. In the embodiment of FIG. 12B, the lattice filter includes two Mach-Zehnder interferometers including three couplers (a first coupler (e.g., an MMI coupler) 1205, a second coupler (e.g., an MMI coupler) 1210, and a third coupler (e.g., an MMI coupler) 1215), and two pairs of waveguides as shown, each of the waveguides having one or more portions 1220 composed of hydrogenated amorphous silicon and one or more portions 1225 composed of crystalline silicon. In some embodiments an otherwise analogous lattice filter includes more than two concatenated Mach-Zehnder interferometers. In the schematic drawing of FIG. 12B, the total lengths of the two waveguides of each pair of waveguides are illustrated to be equal, although in some embodiments they are unequal. As is the case for the embodiment of FIG. 12A, the lengths of portions 1220 composed of hydrogenated amorphous silicon and the lengths of portions 1225 composed of crystalline silicon may be selected to satisfy Equation (2) and to satisfy Equation (3) (or a similar requirement for applications in which higher order effects are significant).

Figure 12C:
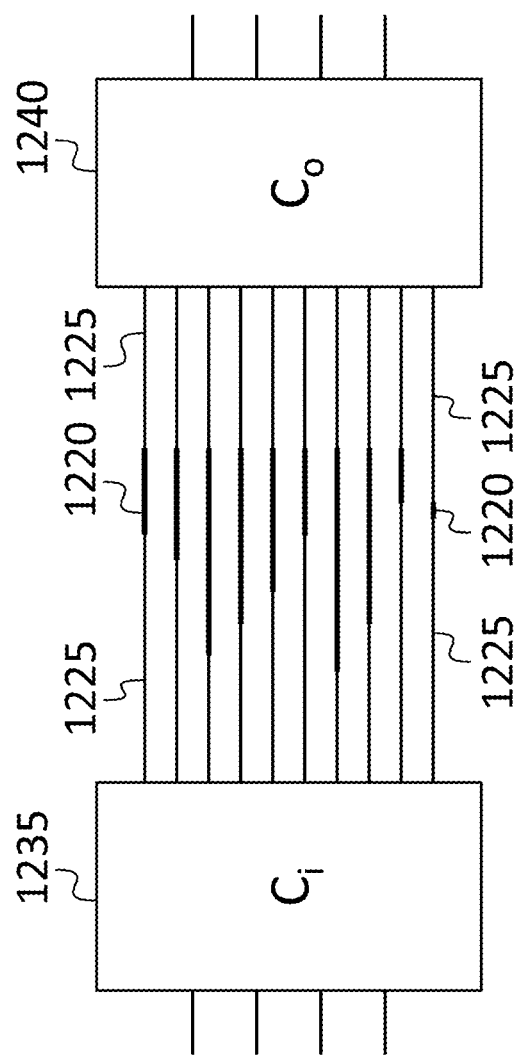
FIG. 12C is a schematic drawing of an athermal generalized Mach-Zehnder interferometer, according to an embodiment of the present invention.

Referring to FIG. 12C, a generalized Mach-Zehnder interferometer may include a first coupler 1235 and a second coupler 1240, the first coupler 1235 and the second coupler 1240 being connected by an array of waveguides, each of the waveguides having one or more portions 1220 composed of hydrogenated amorphous silicon and one or more portions 1225 composed of crystalline silicon. In the schematic drawing of FIG. 12C, the respective total lengths of all of the waveguides of the array of waveguides are illustrated to be equal, although in some embodiments they are unequal. As is the case for the embodiment of FIG. 12A, the lengths of portions 1220 composed of hydrogenated amorphous silicon and the lengths of portions 1225 composed of crystalline silicon may be selected to satisfy Equation (2) and to satisfy Equation (3) (or a similar requirement for applications in which higher order effects are significant).

As used herein, a "coupler" is a passive linear time-invariant optical device having one or more first ports (e.g., input ports) and one or more second ports (e.g., output ports) the total number of input and output ports being at least three. Examples of couplers include MMI couplers, star couplers, directional couplers, Y-junctions, and adiabatic splitters.

Figure 13B:
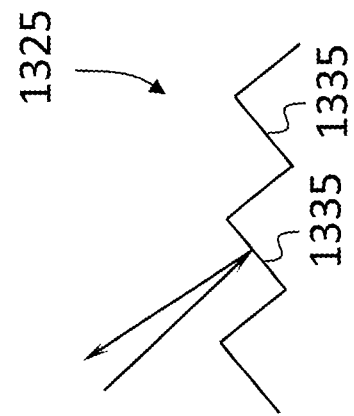
FIG. 13B is an enlarged view of portion 13B of FIG. 13A, according to an embodiment of the present invention.
Figure 13A:
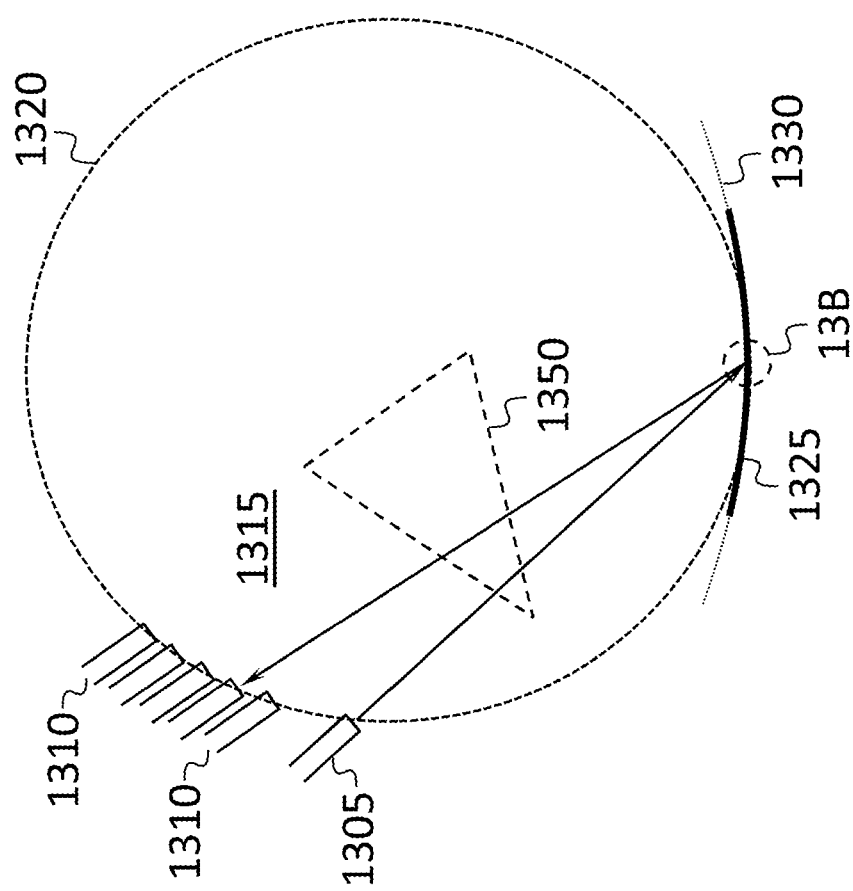
FIG. 13A is a drawing of an athermal echelle grating, according to an embodiment of the present invention.

Referring to FIG. 13A, an echelle grating may be formed with an input waveguide 1305, and with a plurality of output waveguides 1310, each of which is a waveguide ending at a boundary with a slab region 1315, the boundary being on a Rowland circle. The grating may be formed along a grating curve 1330 which may be a portion of a circle having twice the radius of the Rowland circle and being tangent to the Rowland circle within a region of the grating curve illuminated by light from an input waveguide. The grating 1325 may include a series of reflective facets 1335 as illustrated in the enlarged view of FIG. 13B. The slab region 1315 may include a region 1350 of hydrogenated amorphous silicon as shown. The region of hydrogenated amorphous silicon may have any shape that results in different optical paths between a first port waveguide (e.g., an input waveguide) and a second port waveguide (e.g., an output waveguide) satisfying Equation (2) and satisfying Equation (3) (or a similar requirement for applications in which higher order effects are significant).

Although exemplary embodiments of a T-shaped arrayed waveguide grating have been specifically described and illustrated herein, many modifications and variations will be apparent to those skilled in the art. Accordingly, it is to be understood that a T-shaped arrayed waveguide grating constructed according to principles of this invention may be embodied other than as specifically described herein. The invention is also defined in the following claims, and equivalents thereof.

What is claimed is:

1. An arrayed waveguide grating, comprising:
    a first star coupler;
    a second star coupler;
    an array of waveguides connecting the first star coupler and the second star coupler;
    one or more first port waveguides connected to the first star coupler; and
    one or more second port waveguides connected to the second star coupler,
    wherein:
        a first optical path, from a first waveguide of the first port waveguides, through a first waveguide of the array of waveguides, to a first waveguide of the second port waveguides, includes a portion, having a first length, within hydrogenated amorphous silicon, the remainder of the first optical path is within crystalline silicon,
        a second optical path, from the first waveguide of the first port waveguides, through a second waveguide of the array of waveguides, to the first waveguide of the second port waveguides, includes a portion, having a second length, within hydrogenated amorphous silicon,
the remainder of the second optical path is within crystalline silicon,
the second length is different from the first length,
the first waveguide of the array of waveguides includes a first portion, having a length equal to the first length, composed of hydrogenated amorphous silicon,
the remainder of the first waveguide of the array of waveguides is composed of crystalline silicon, and
the first waveguide of the array of waveguides defines only a single optical path at a junction where an end of the first portion of the first waveguide of the array of waveguides is in direct contact with an end of a portion of the remainder of the first waveguide of the array of waveguides.

2. The arrayed waveguide grating of claim 1, wherein a rate of change, with temperature, of a center wavelength of a channel of the arrayed waveguide grating is less than 70 pm 1° C.

3. The arrayed waveguide grating of claim 1, wherein:
the second waveguide of the array of waveguides includes a portion, having a length equal to the second length, composed of hydrogenated amorphous silicon, and
the remainder of the second waveguide of the array of waveguides is composed of crystalline silicon.

4. The arrayed waveguide grating of claim 3, wherein an interface between the first portion of the first waveguide and the portion of the remainder of the first waveguide is a substantially planar surface having a surface normal, an angle between the surface normal and a longitudinal direction of the first portion being greater than 0.1 degrees.

5. The arrayed waveguide grating of claim 4, wherein the angle between the surface normal and the longitudinal direction of the first portion is less than 30 degrees.

6. A multi-path interference filter, comprising:
a first port waveguide;
a second port waveguide; and
an optical structure connecting the first port waveguide and the second port waveguide,
the optical structure having:
a first optical path from the first port waveguide to the second port waveguide, and
a second optical path, different from the first optical path, from the first port waveguide to the second port waveguide,
the first optical path having a portion, having a first length, within hydrogenated amorphous silicon,
the second optical path having a portion, having a second length, within crystalline silicon, and
the second optical path having either
no portion within hydrogenated amorphous silicon, or
a portion, having a third length, within a first portion of a first waveguide, the first portion of the first waveguide being composed of hydrogenated amorphous silicon, the third length being less than the first length, the first waveguide defining only a single optical path at a junction where an end of the first portion of the first waveguide directly contacts an end of a second portion of the first waveguide, the second portion of the first waveguide being composed of crystalline silicon.

7. The multi-path interference filter of claim 6, wherein an optical path delay difference between the first optical path and the second optical path has a rate of change, with temperature, of less than 2e-5 radians/° C.

8. The multi-path interference filter of claim 6, wherein the optical structure comprises a Mach-Zehnder interferometer comprising:
a first coupler,
a second coupler,
the first waveguide, the first waveguide connecting the first coupler and the second coupler, and
a second waveguide connecting the first coupler and the second coupler,
wherein:
a portion of the second optical path is within the first waveguide, and
a portion of the first optical path is within the second waveguide.

9. The multi-path interference filter of claim 6, wherein the optical structure comprises a generalized Mach-Zehnder interferometer comprising:
a first coupler,
a second coupler,
the first waveguide, the first waveguide connecting the first coupler and the second coupler,
a second waveguide connecting the first coupler and the second coupler,
a third waveguide connecting the first coupler and the second coupler, and
wherein:
a portion of the second optical path is within the first waveguide, and
a portion of the first optical path is within the second waveguide.

10. The multi-path interference filter of claim 6, wherein the optical structure comprises two concatenated Mach-Zehnder interferometers.

11. The multi-path interference filter of claim 6, wherein the optical structure comprises an echelle grating.

12. The multi-path interference filter of claim 6, wherein an optical path delay difference between the first optical path and the second optical path exhibits a maximum change, over a temperature range extending from 20° C. to 70° C., of less than 2e-3 radians.

13. The arrayed waveguide grating of claim 1, wherein a waveguide core of the first portion of the first waveguide of the array of waveguides directly contacts a waveguide core of the portion of the remainder of the first waveguide of the array of waveguides.

14. The arrayed waveguide grating of claim 1, wherein the first portion of the first waveguide of the array of waveguides and the portion of the remainder of the first waveguide of the array of waveguides are directly above a same layer.

15. The arrayed waveguide grating of claim 14, wherein the first portion of the first waveguide of the array of waveguides and the portion of the remainder of the first waveguide of the array of waveguides are directly above a buried oxide layer of a silicon-on-insulator wafer.

16. The arrayed waveguide grating of claim 1, wherein a height of the first portion of the first waveguide of the array of waveguides is substantially the same as a height of the portion of the remainder of the first waveguide of the array of waveguides.

17. The arrayed waveguide grating of claim 1, wherein the first portion of the first waveguide of the array of waveguides does not overlap in a plan view with the portion of the remainder of the first waveguide of the array of waveguides.

18. The arrayed waveguide grating of claim 1, wherein the first waveguide of the array of waveguides is at least partially defined by two trenches that extend along at least part of an optical path of the first waveguide of the array of waveguides and on opposite sides of the optical path of the first waveguide of the array of waveguides, and
   wherein the two trenches extend continuously across the junction of the first waveguide of the array of waveguides.

19. The arrayed waveguide grating of claim 1, wherein the end of the first portion of the first waveguide of the array of waveguides is a surface spanning:
   directly between a top and a bottom of the first waveguide of the array of waveguides on opposite sides of the optical path of the first waveguide of the array of waveguides, and
   directly between a first side and a second side of the first waveguide of the array of waveguides on opposite sides of the optical path of the first waveguide of the array of waveguides.

* * * * *